United States Patent Office 3,192,758
Patented July 6, 1965

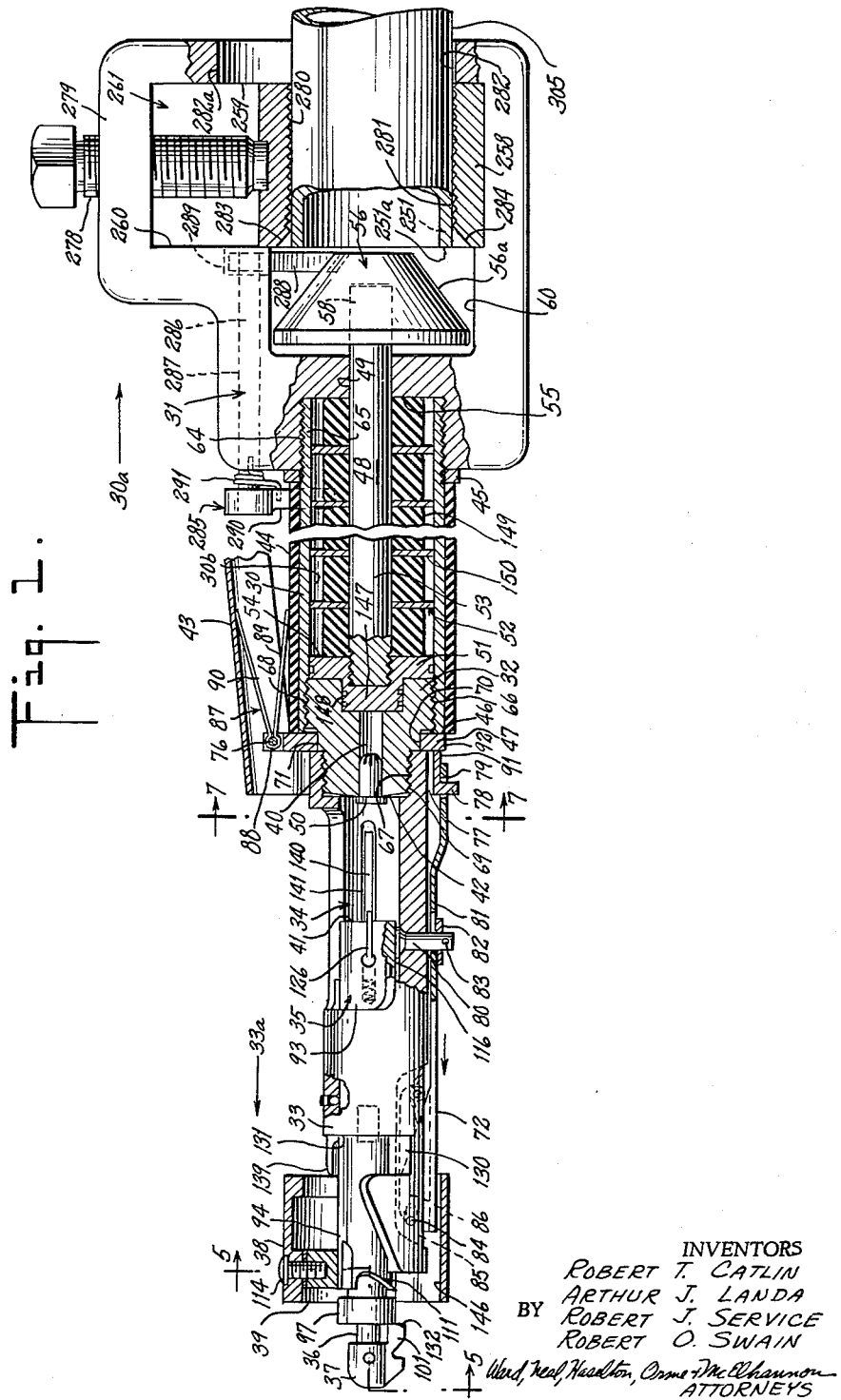

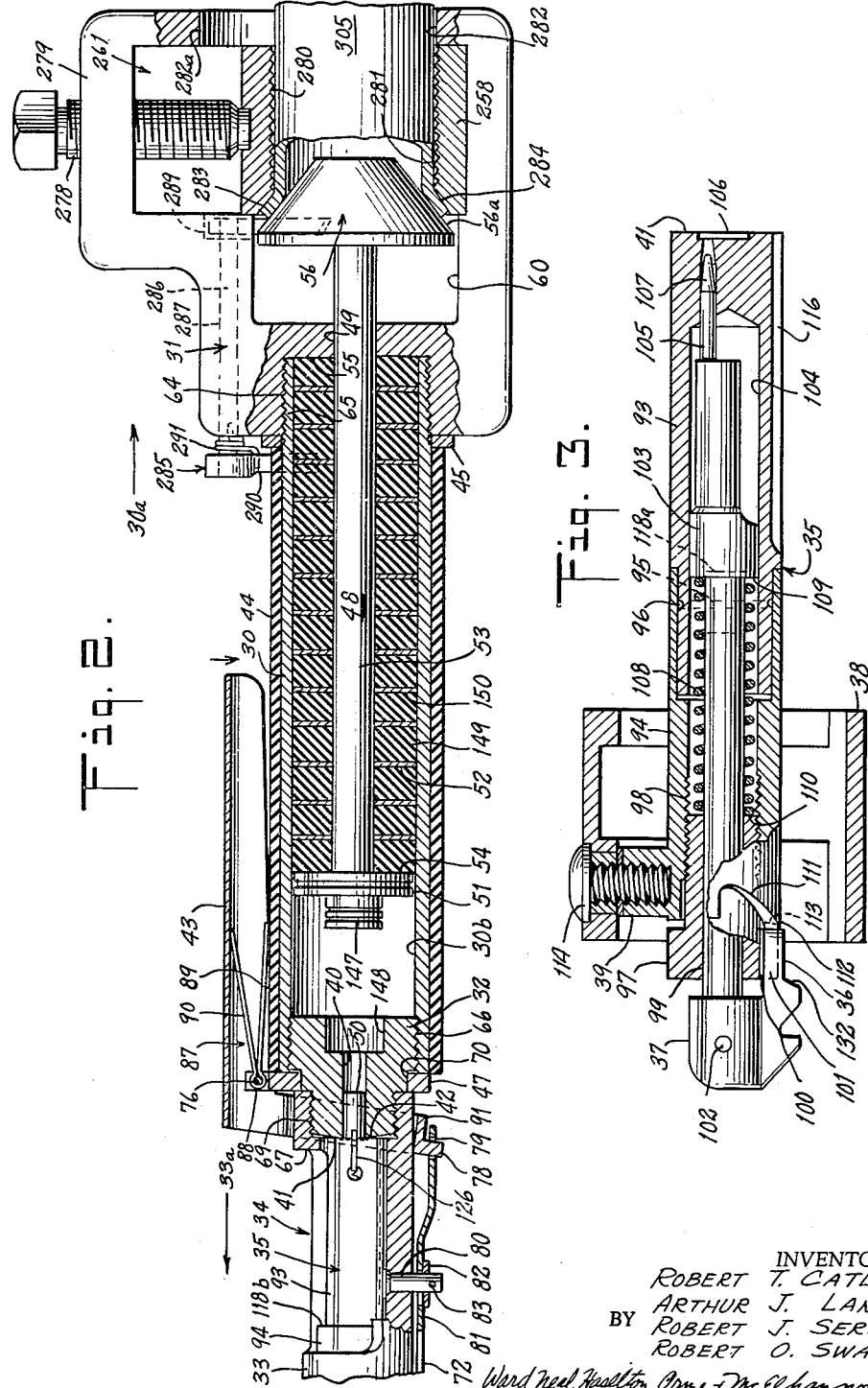

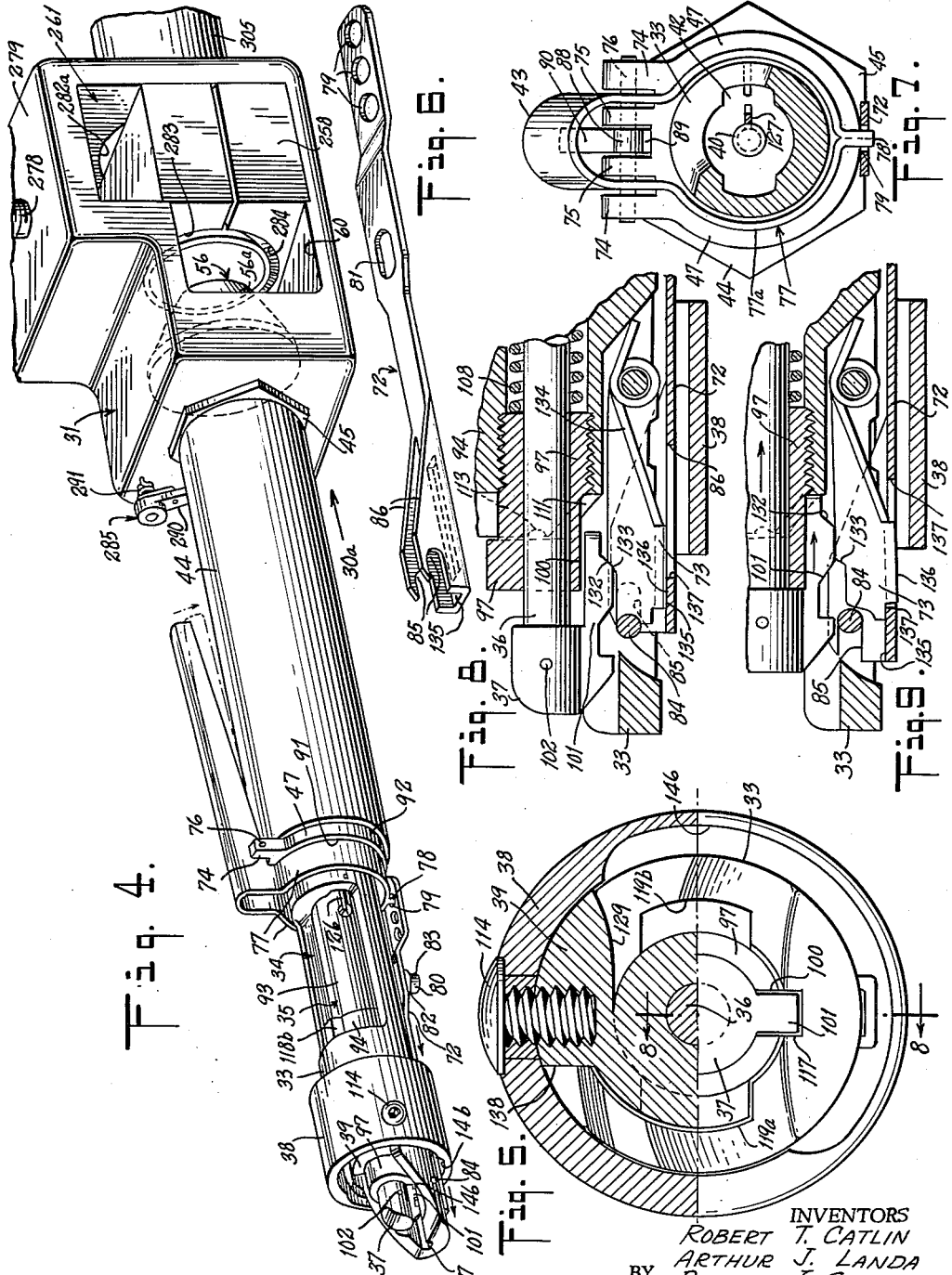
INVENTORS
ROBERT T. CATLIN
ARTHUR J. LANDA
ROBERT J. SERVICE
ROBERT O. SWAIN
BY Ward, Neal, Haselton, Orme & McElhannon
ATTORNEYS

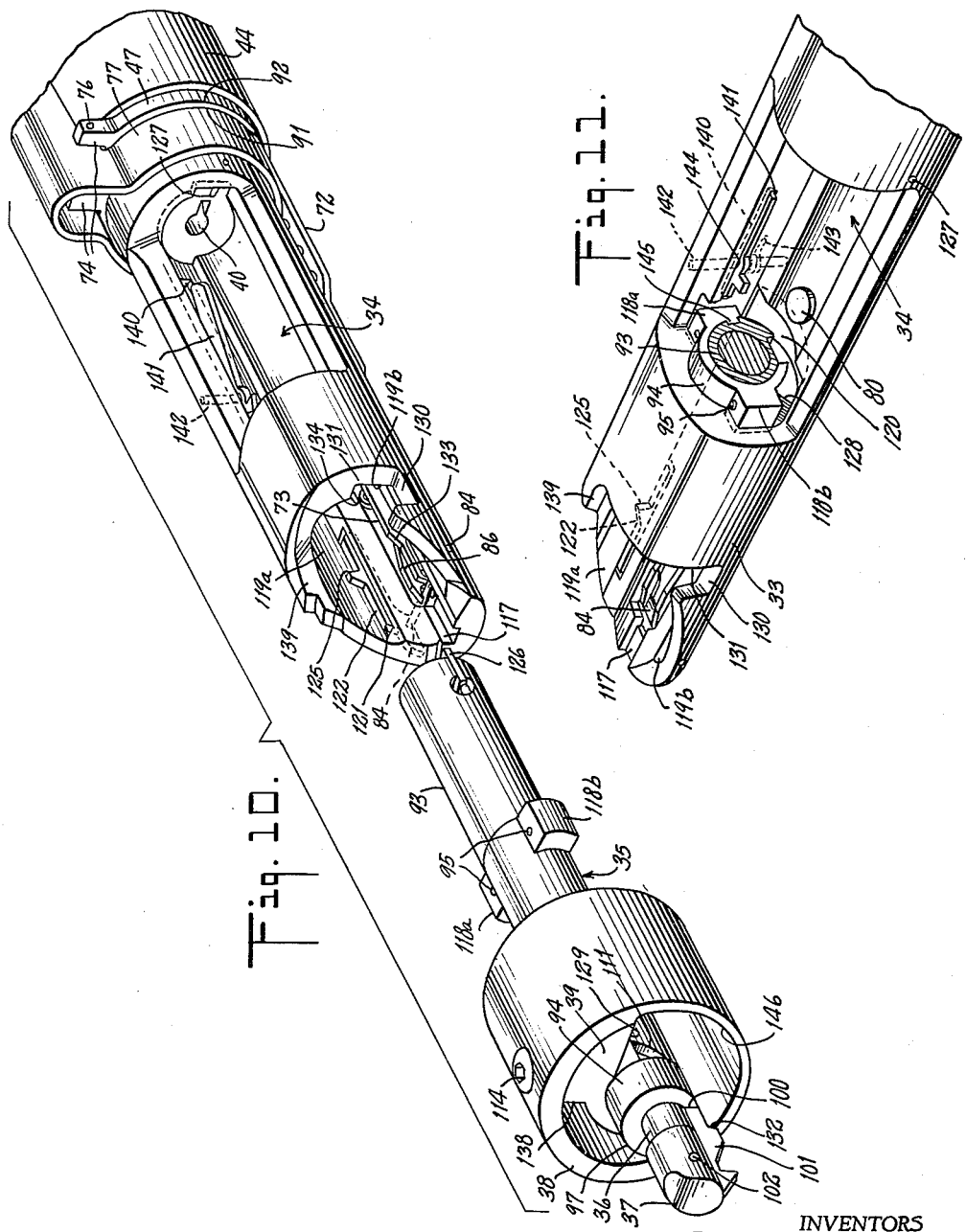

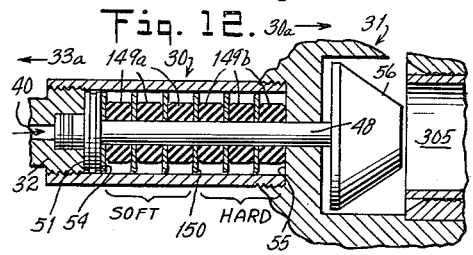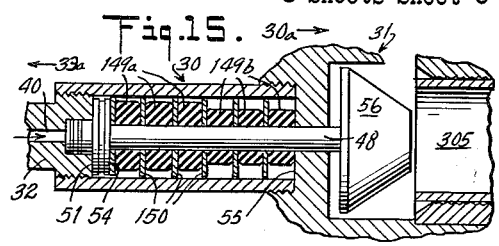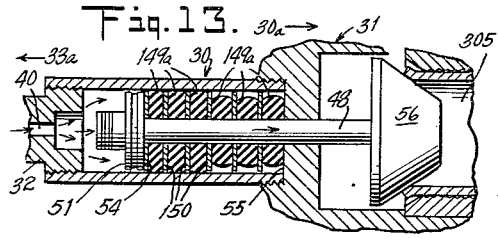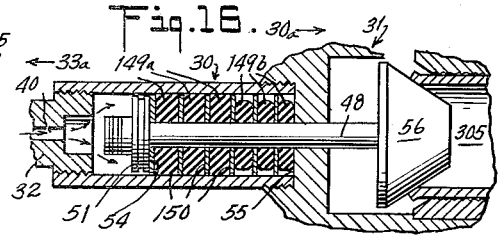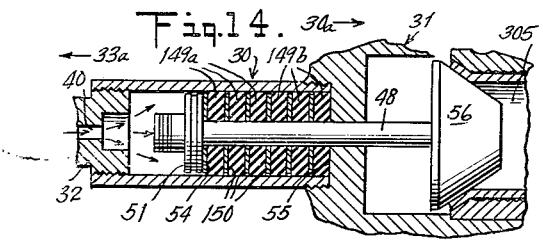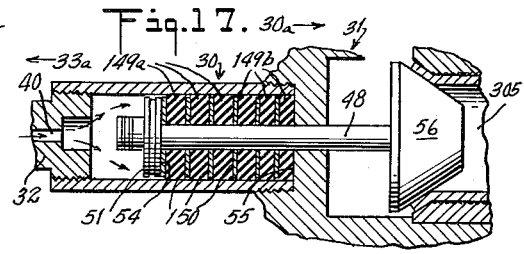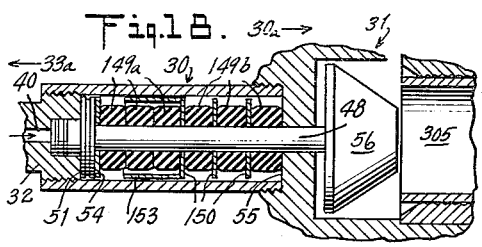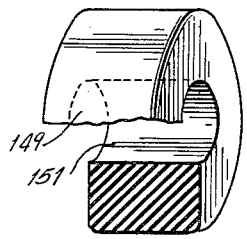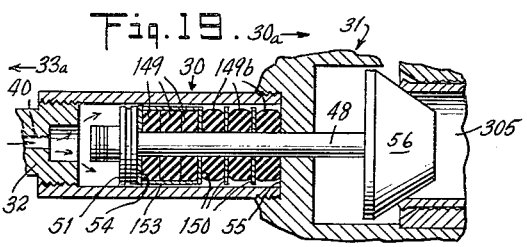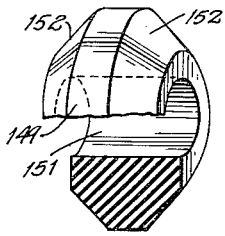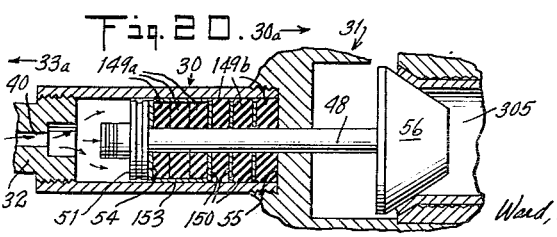

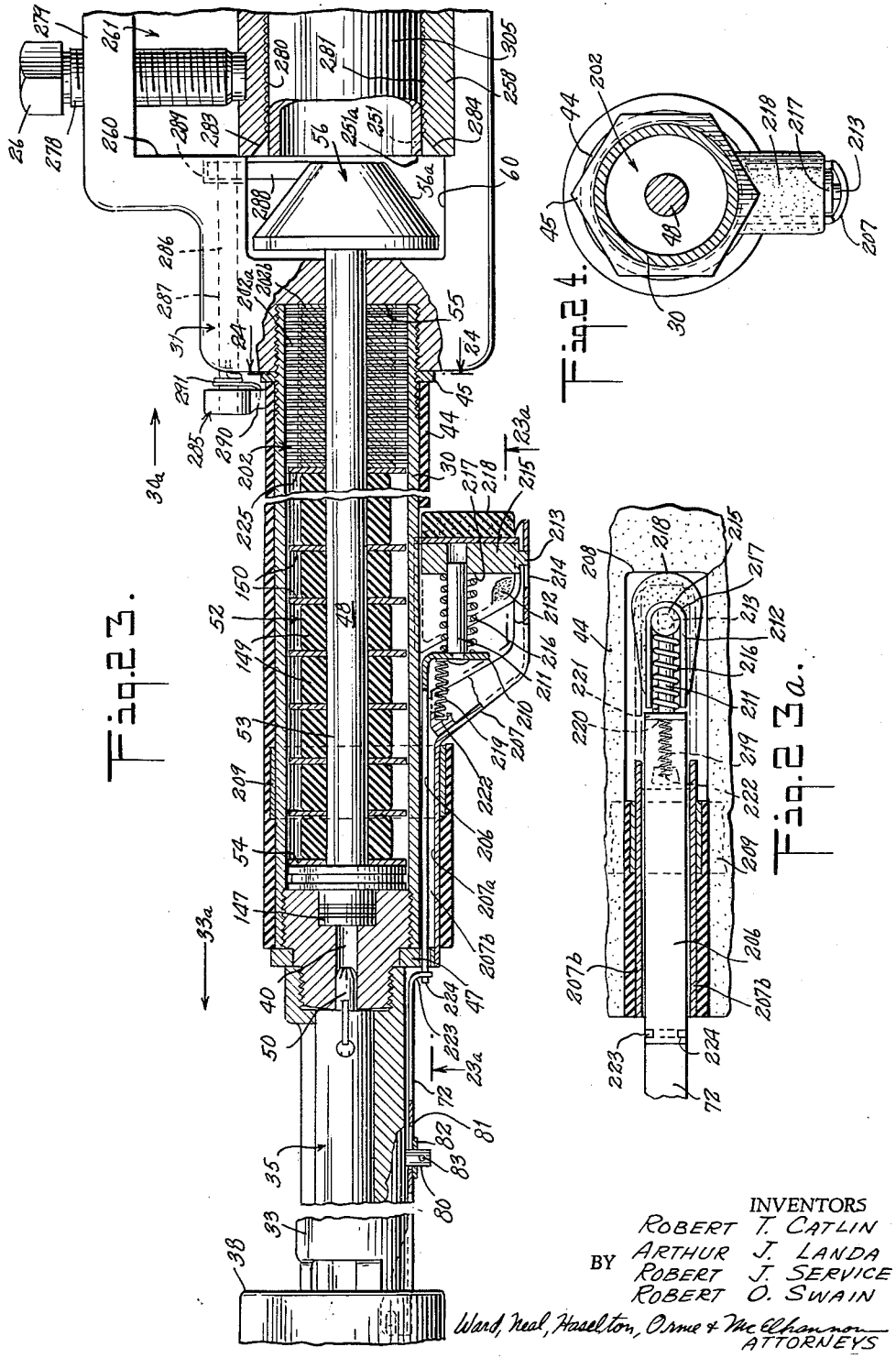

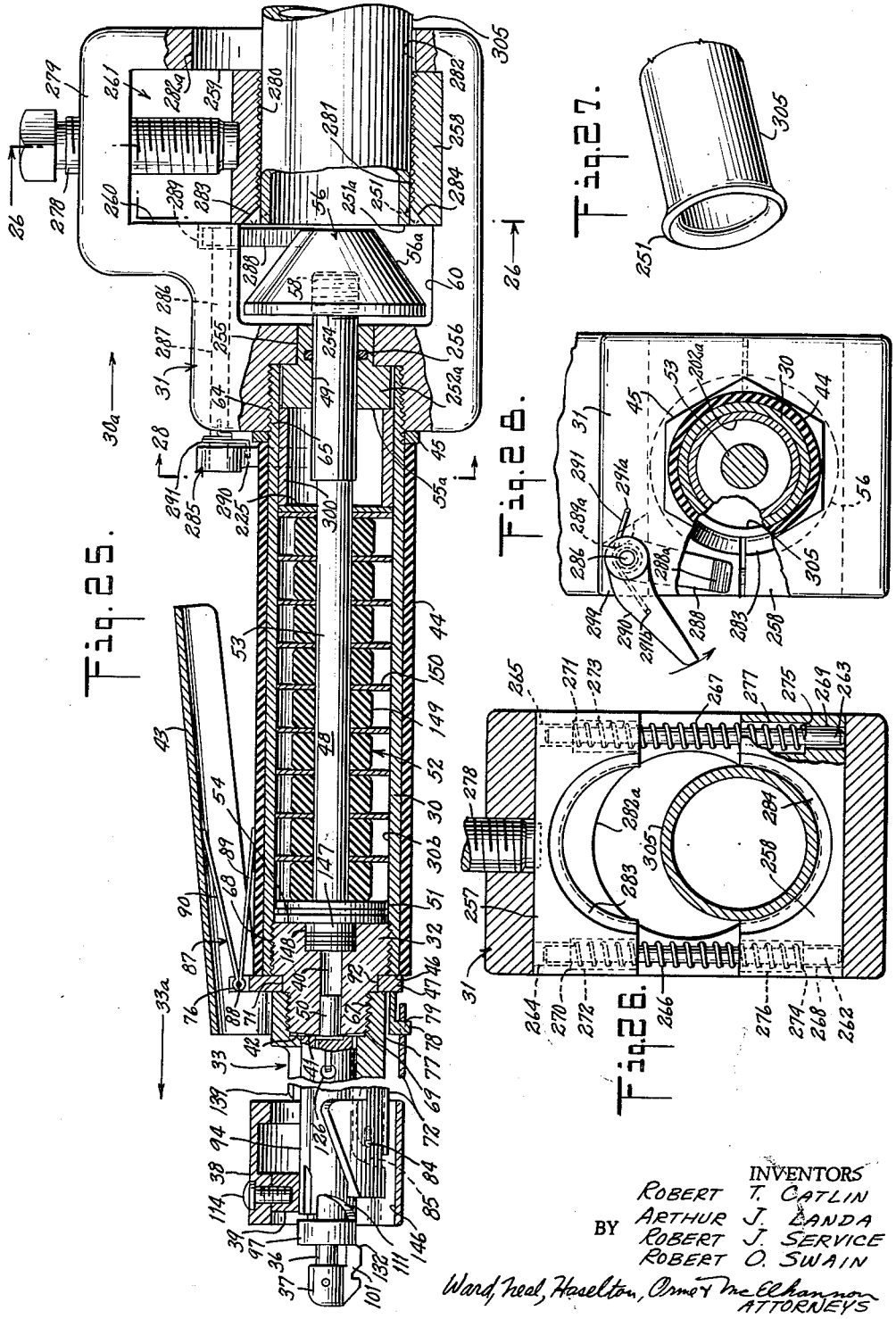

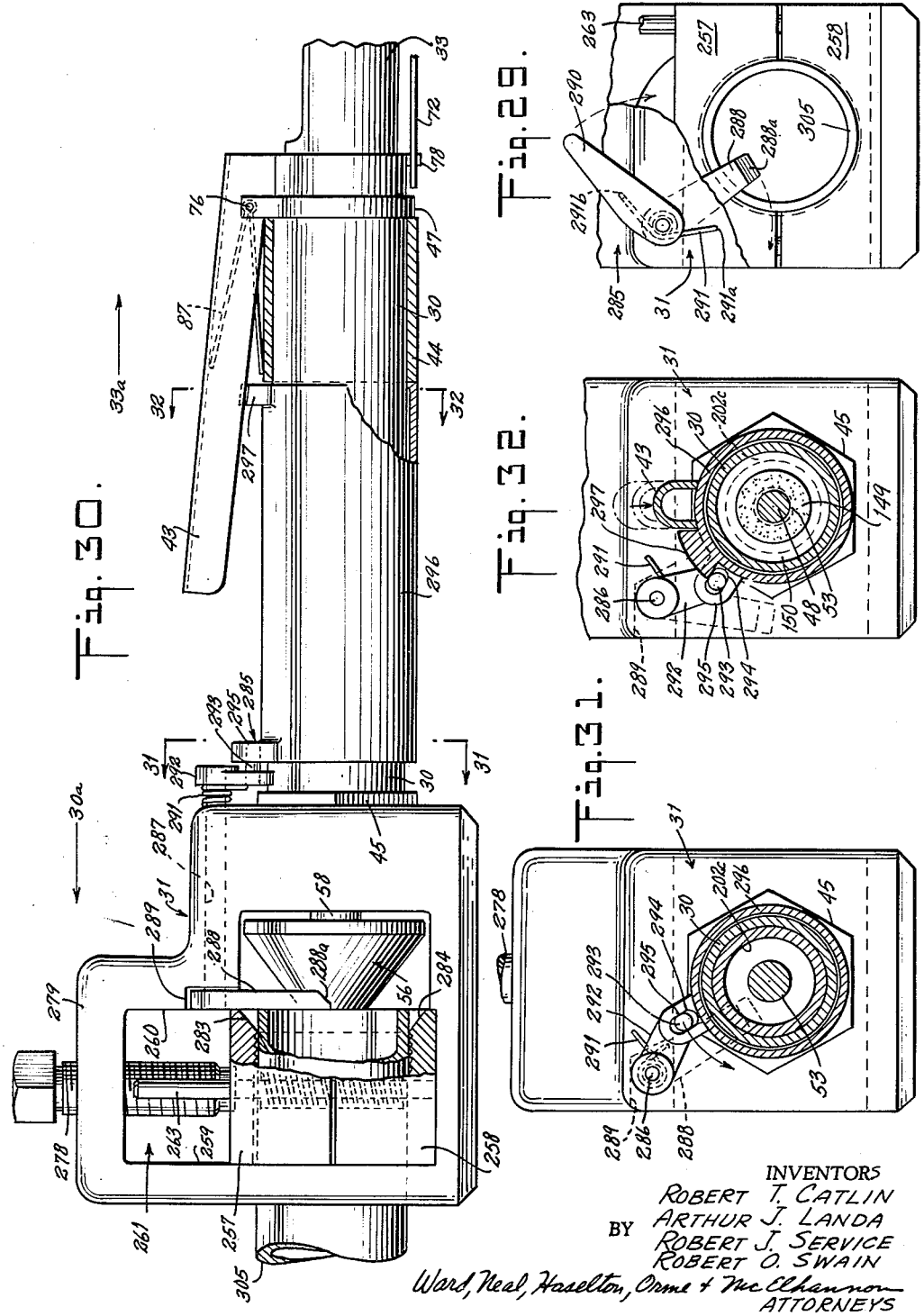

3,192,758
EXPLOSIVELY ACTUATED FLARING TOOL
Robert T. Catlin, Trumbull, and Arthur J. Landa, Shelton, Conn., Robert J. Service, Ilion, N.Y., and Robert O. Swain, Trumbull, Conn., assignors to Remington Arms Company, Inc., Bridgeport, Conn., a corporation of Delaware
Original application Aug. 10, 1960, Ser. No. 48,764, now Patent No. 3,126,630, dated Mar. 10, 1964. Divided and this application Oct. 18, 1962, Ser. No. 231,398
The portion of the term of the patent subsequent to Mar. 31, 1981, has been disclaimed
22 Claims. (Cl. 72—316)

This application is a division of our copending application Serial No. 48,764, filed August 10, 1960, issued as U.S. Patent No. 3,126,630 on March 10, 1964.

This invention relates to tools for shaping apertures in metal and the like. More particularly the invention relates to explosively actuated flaring tools for providing flared shape to the metal at the end of metal tubing or at similar apertures.

Where a flare is to be provided at the end of a metal conduit, and rather than employing usual hammer-driven or advancing screw thread manual type equipment, one conventional tube flaring method involves the use of an electrically driven machine to roll rather than impress, the end of the tube into the desired tapered flare configuration. This machine, which is usually relatively large and weighs several hundred pounds, is mounted on a cabinet stand or the like and has an electrically rotated head which mounts a tapered flaring cone. The flaring cone revolves freely on an eccentrically mounted bearing and, when brought into contact with the end of the tube which is held in place in a mechanical or pneumatic tube clamping device, rolls around the circumference of the tube to press it against a backing die so as to form the desired flared end configuration. In spite of the benefit afforded by elimination of such manual labor, when the machine is used to flare tubes made of certain metals, the tube material tends to become work-hardened as the roll-flaring operation progresses and, in many cases, the flared end will rupture before it has been completely formed. It is thought that this difficulty can be largely overcome by increasing the speed with which the flare is completely formed, such as by forming the flare substantially instantaneously in a shock-type operation rather than by roll forming, so as to bypass the work hardening effect. Moreover it appears that such conventional manual or electric tube flaring equipment as has been used is limited with respect to its effective capability of providing flared ends on tubes within the general size range of from ⅛ inch to 2 inches in diameter. However, because of recent developments in certain fields wherein tube flaring operations are involved, the trend is towards use of larger diameter tubing, and towards the use of tubes made of harder materials, such as stainless steel. Thus for all of these reasons, the need for appropriate power driven flaring equipment has increased.

Where explosively actuated tools have been used, in many cases they have been dangerous to handle because they are subject to severe recoil and counter-recoil and may twist or otherwise move erratically during operation. Such undesirable tool action may be due to inadequate provision for dampening of reaction forces which are set up in response to explosion of the powder charge, and to the construction and arrangement of tool parts such as the trigger and bolt firing mechanisms, and other elements. Moreover, such tools as have been used sometimes are difficult to accurately position against the work for effective hole shaping, are sometimes limited in application to perhaps a single type of work and, insofar as the inventors hereof are aware, do not provide effective self-retraction of the flaring instrument from the metal. Furthermore, some explosively actuated tools break down during use, and this is believed to be due to inadequate dampening or braking of the piston driver element upon firing the tool, the element destroying itself or the tool by repeated impacts against abutting elements within the barrel.

The present invention provides an explosively actuated flaring tool which overcomes these and other disadvantages. It is portable and does not require an outside power source. It is light in weight, economical and safe in operation. Only one hand need be used to position and fire the tool, and it will be found that recoil and counter-recoil are hardly noticeable to the operator. The tool will have almost no tendency to twist or otherwise move erratically during use. Moreover, tubes of relatively large diameter and of relatively hard material may be effectively flared at their ends in simple, convenient manner without danger of rupturing the tube end.

Generally describing the operation of the tool which is here provided, a small caliber blank cartridge is fired within the device to drive the flaring instrument into contact with the workpiece. As will be seen, the flaring instrument will be immediately and automatically retracted at the end of its stroke, yet the operator will realize very little tool "kick" during use. The tool has a barrel section linearly aligned and attached to a receiver section which mounts a bolt firing mechanism. The tool is arranged so that, by a simple, counterclockwise twisting and withdrawal motion, the bolt mechanism may be drawn away from the barrel section, to expose an axially aligned cartridge chamber at the receiver end of the barrel section wherein the small caliber, blank cartridge power load is inserted. After inserting the cartridge, the bolt mechanism is moved forward and rotated in clockwise direction to close and lock the cartridge chamber. Alternatively, it may be rotated about forty-five degrees to a safety position in which it is impossible to fire the tool but in which the bolt cannot be accidentally withdrawn, or it may be rotated a substantially greater amount, about ninety degrees, to the firing position of the tool.

When the tool has been loaded and is positioned for firing, the operator either simply inserts the workpiece in an integrated work-holding jig of the tool, or moves the tool against the workpiece, depending upon the tool modifications employed, and fires it. The pressure of the expanding gases from the exploded cartridge impels a slidable piston within the barrel section, to which the flaring instrumentality is attached, a predetermined short distance forward to move the instrument into sudden impact with the workpiece. The tool provides automatic, full retraction and repositioning of the flaring instrument immediately after firing, to its initial, pre-firing position ready for the next operation. The entire operation is quick, safe, and instantaneously effective to accurately provide a flared configuration surrounding a workpiece aperture by a single firing of the tool.

The tool is designed to propel the flaring instrument forward the desired distance with just the proper amount of power required to properly flare the aperture edges, yet not distort the surrounding metal, and thereafter to fully retract the instrument, taking into consideration the amount of energy which is absorbed by the workpiece. Furthermore, it will be found that recoil and counter recoil of the tool are hardly noticeable to the operator, and that the tool will have almost no tendency to twist or otherwise move erratically during use. This substantial elimination of tool "kick" assures greater operator overall efficiency and accuracy in use.

Referring more particularly to the preferred form of tool construction, the invention provides a novel piston buffer system within the barrel section which, prior to firing the tool, extends effectively the full length of the barrel. The buffer assembly generally consists of a stack of buffer rings of elastically deformable material, such as neoprene, polyurethane or the like, alternating with interposed metal impact rings. The assembly surrounds that portion of the piston rod which is normally disposed within the barrel, and extends between retaining means on the muzzle-facing end of the piston and a centrally apertured abutment wall at the muzzle end of the barrel so as to be compressed between the piston and the abutment wall as the piston is impelled towards the muzzle end by the explosion of the powder charge. The elastically deformable buffer rings have diameter somewhat less than the internal diameter of the barrel and are relatively thick, so that during compression, they expand into contact with the barrel wall. As will be seen, the buffer system provides controlled braking of the piston element during its forward travel. Because of the resilient nature of the buffer rings, the system also causes repositioning of the piston to its normal location with its receiver-facing end at the receiver end of the barrel, and therefore full retraction of the attached flaring instrument instantaneously after the flare has been formed. Modifications of the form, characteristics and arrangement of the buffer rings, as will be described, will provide modified piston braking effects in the tool, yet instantaneous retraction of the flaring instrument upon completion of the firing cycle. Further modifications in the buffer system, as will be seen, will effect accurate determination of the length of stroke of the flaring instrument, yet achieve all of the other desired tool characteristics.

A novel, sleeve type firing bolt retractor is also provided which materially contributes to effective operation of the tool. Normally, bolt action guns and bolt action explosively actuated tools have a relatively heavy metal lever extending outwardly from the bolt and receiver section which the operator grasps and lifts to withdraw the bolt and open the breech of the device. In the present invention, this extending lever is eliminated and replaced by a lightweight cylindrical sleeve, of plastic or the like, which sleeves around the receiver section of the tool in relatively close fitting relation when the bolt is in its closed position. This novel sleeve type bolt retractor is more durable than is the lever type, being not susceptible to breaking off by accidental impact. Further, and aside from its light weight which causes a reduction in the total inertia of the tool under dynamic conditions of firing, the sleeve bolt retractor eliminates the setting up of unbalanced inertia forces during tool firing which normally would occur due to the radially extending, relatively heavy moment arm of a lever were such provided. These forces would cause twisting or other erratic movement of the tool upon firing.

In a preferred construction of the tool the trigger mechanism does not include a trigger of the conventional, finger-operated type ordinarily found in guns and the like. It has been found that such conventional triggers, which do not include the features of the modified form of finger-operated trigger hereinafter to be described, transmit a considerable amount of tool recoil and counter-recoil to the finger or hand of the operator, causing soreness and resulting fatigue in the hand. Instead, the preferred construction provides a hand-pressure actuated trigger lever which extends substantially parallel to the barrel towards the muzzle end of the tool. It pivots at the general location of the junction between the barrel and receiver sections, and figuratively speaking wraps around the tool to the other side where it is coupled to a longitudinally extending sear link which is moved upon trigger actuation to activate the firing mechanism of the tool. In explosively actuated tools, it has been found that this novel trigger mechanism not only overcomes the referred to difficulties of the conventional mechanisms, but also promotes the ease with which the tool is operated.

In a modified construction, a more conventional finger-operated trigger mechanism is provided also to eliminate the referred to tool-firing reaction difficulties which can be traced primarily to counter-recoil effects. The trigger link and trigger arrangement includes a trigger cushioning spring, as will be described, which dampens the counter-recoil forces in the tool which would act against the finger to cause soreness and resulting fatigue in the hand of the operator. Furthermore, it should be noted that in both embodiments, the trigger is located on the barrel section of the tool for proper balance and convenience during tool operation.

The preferred embodiment of the invention also includes a detachable jig or backing die head at the muzzle end of the tool. Where tube flaring operations are to be performed, the attached jig is arranged and constructed to clamp the work accurately and effectively in position, yet provide convenience in removing the tool from the work after the flare has been formed.

Thus, the extremely effective flaring tool here described takes only a few seconds to load, position and discharge, and offers convenience and efficiency in operation. It delivers uniform power, time after time, regardless of the operator's skill, allows the operator to conveniently station himself with respect to the workpiece, and reduces operator fatigue and error by affording easy operation.

These and other objects and features of the invention will become more readily apparent from the following detailed description thereof when taken with reference to the accompanying drawings in which:

FIGURE 1 is a view, in axial sectional elevation, of a tool embodying the invention as it would appear with its bolt mechanism in withdrawn position, exposing the cartridge chamber in the tool;

FIGURE 2 is a fragmentary view similar to FIGURE 1, to show the tool as it would appear with its breech closed by the bolt mechanism, and immediately after firing the tool, whereupon the flaring instrument is at the end of its stroke;

FIGURE 3 is an enlarged axial side elevation, partially in cross-section, of the bolt member of the tool, to show the details of its construction;

FIGURE 4 is a perspective view of a tool embodying the invention, as it would appear immediately upon firing and in the condition shown by FIGURE 2, to further show the general arrangement of the tool;

FIGURE 5 is an enlarged end view of the tool as seen in staggered cross-section viewed from lines 5—5 of FIGURE 1, to show certain details of the novel, ring-type bolt sleeve of the tool;

FIGURE 6 is a perspective view of the sear link element of the tool;

FIGURE 7 is a view in cross-section taken at lines 7—7 of FIGURE 1, to show details of construction of the trigger lever and sear link attachment in the tool;

FIGURE 8 is an enlarged fragmentary view of the receiver end portion of the tool, in axial sectional elevation as viewed from lines 8—8 of FIGURE 5, to show in detail the operable association between the trigger and firing mechanism as the parts would appear when the tool is in condition ready for firing;

FIGURE 9 is a view similar to FIGURE 8, showing the parts as they would appear immediately after the tool has been fired;

FIGURE 10 is an exploded assembly view of the breech end of the tool to show how the bolt firing mechanism is mounted in the receiver section of the tool;

FIG. 11 is a fragmentary view in perspective of the breech of the tool with a cross-sectional fragment of the bolt firing mechanism therewithin to show further details of the operable engagement between the bolt mechanism and receiver section;

FIGURE 12 is a fragmentary diagrammatic view of the barrel section of the tool, in axial sectional elevation, to show a modified form of the buffer system therewithin as normally arranged prior to firing the tool;

FIGURE 13 is a diagrammatic view of the buffer system of FIGURE 12, as it would appear immediately after the tool has been fired, but before the flaring instrument has reached the end of its stroke;

FIGURE 14 is a diagrammatic view of the buffer system of FIGURES 12 and 13 as it would appear when the flaring instrument has reached the end of its stroke;

FIGURE 15 is a fragmentary diagrammatic view of the barrel section of the tool, in axial sectional elevation, to show another modified form of the buffer system therewithin as normally arranged prior to firing the tool;

FIG. 16 is a diagrammatic view of the buffer system of FIGURE 15 as it would appear immediately after the tool has been fired, but before the flaring instrument has reached the end of its stroke;

FIGURE 17 is a diagrammatic view of the buffer system of FIGURES 15 and 16, as it would appear when the flaring instrument has reached the end of its stroke;

FIGURE 18 is a fragmentary diagrammatic view of the barrel section of the tool, in axial sectional elevation, to show still another modified form of the buffer system therewithin as normally arranged prior to firing the tool;

FIGURE 19 is a diagrammatic view of the buffer system of FIGURE 18 as it would appear immediately after the tool has been fired, but before the flaring instrument has reached the end of its stroke;

FIGURE 20 is a diagrammatic view of the buffer system of FIGURES 18 and 19 as it would appear when the flaring instrument has reached the end of its stroke;

FIGURE 21 is an enlarged perspective view, partially in cross-section, of a preferred form of buffer ring which forms a part of a buffer system of a tool made in accordance with the invention;

FIGURE 22 is a view similar to FIGURE 21 showing a modified form of buffer ring;

FIGURE 23 is a side elevation partially in section, of a tool embodying the invention to show a modified form of trigger mechanism, and further to show still another modified form of buffer system, the tool in condition ready for firing; FIGURE 23a is a fragmentary sectional plan view, taken at lines 23a—23a of FIGURE 23, to show certain trigger elements in greater detail;

FIGURE 24 is a front elevation of the tool shown by FIGURE 23 as viewed from lines 24—24 thereof;

FIGURE 25 is a view, in axial sectional elevation, of a tool in accordance with the invention for flaring the ends of tubing, as it would appear with its bolt mechanism in closed position ready for firing, to shown still another modification of the buffer system, and a flaring instrumentality and its associated backing die head which includes clamping means, the clamping means incorporating means for accurately positioning the tubular workpiece therein;

FIGURE 26 is a view in cross section taken generally at lines 26—26 of FIGURE 25, but modified to show the clamping means in open position;

FIGURE 27 is a perspective view of a tubular workpiece which has a flared end formed by the tool of FIGURE 25;

FIGURE 28 is a breakaway sectional view taken at lines 28—28 of FIGURE 25 to show the details of the workpiece positioning device therein illustrated;

FIGURE 29 is a breakaway sectional view of the tool as generally viewed from lines 28—28 in FIGURE 25, but modified to show a slightly different form of the workpiece positioning device therein generally illustrated, the positioning device stationed for positioning the work;

FIGURE 30 is a fragmentary side elevation, partially in section, of the flaring tool to illustrate a preferred form of workpiece positioning device incorporated in the tool;

FIGURE 31 is a sectional view taken at lines 31—31 of FIGURE 30, to show the details of the preferred workpiece positioning device therein illustrated; and FIGURE 32 is a sectional view taken generally at lines 32—32 of FIGURE 30, to show further details of the preferred workpiece positioning device, but modified to show the positioning device actuated to its position out of engagement with the workpiece and enabling the tool to be fired.

The general arrangement of the explosively actuated flaring tool provided by the invention is best described by reference to FIGURES 1 and 4. The tool has a barrel section 30, enclosed at the muzzle end 30a of the tool by a head member which is generally indicated by numeral 31 and at the breech end 33a of the tool by a barrel closure member 32 which has formed therein an axially extending cartridge chamber 40. Receiver section 33 is attached to the barrel section 30, as shown. The breech 34 of the tool is located in the receiver section 33 which has hollowed construction to receive the slidably mounted bolt firing mechanism of the tool. The firing mechanism generally comprises a bolt member 35, a firing pin 36 having an attached firing pin head 37, and a cylindrical firing bolt retractor, or bolt sleeve 38. The bolt sleeve 38 is attached to a handle portion 39 of the bolt member for grasping to move the bolt mechanism into and out of operable association with the cartridge chamber 40, the forward end 41 of the bolt member 35 engaging the receiver-facing surface 42 of the closure member 32 when the tool is in condition ready for firing.

In one preferred embodiment of the invention, as shown by FIGURES 1, 2 and 4 for example, firing action is triggered by hand pressure on the longitudinally disposed trigger lever 43. By a simple squeezing or pressing motion, trigger lever 43 activates the firing mechanism as will be seen. In another embodiment, as shown by FIGURE 23, a more conventional, but improved finger-actuated trigger member and trigger shoe arrangement is provided, as will be described.

To minimize the possibility of the tool slipping from the hand, barrel section 30 has a surrounding hand grip 44 which is made of vulcanized rubber-impregnated fibre, plastic, or the like and which is held in place by the lock nut 45, against the surface 46 of the trigger bracket 47. It becomes apparent that the tool is easily operated and involves the use of only one hand by the operator.

Firing of the tool will cause a flaring instrument, generally indicated in FIGURE 1 by numeral 48, to shoot forward a short distance, about an inch or more, from the muzzle of the tool into contact with the workpiece 305 upon which the flaring operation is to be performed, and to thereafter instantaneously retract it to its initial position. As shown in FIGURE 27, a tapered flare 251 will be formed on the tubular workpiece 305. Movement of the flaring instrument is linear, in axial direction, through aperture 49 of the head member 31 in response to explosion of a cartridge powder charge 50 placed within chamber 40. The expanding powder gas impels the piston 51, which is slidable within the barrel and at the end of which the flaring instrumentality is formed, toward the muzzle end of the tool. Piston travel, and hence the stroke of the instrument, is limited and determined by the elastically deformable buffer system of the tool, generally indicated by numeral 52, which surrounds but is slidable on the piston rod portion 53 of the flaring instrument 48. The buffer system 52 effectively extends the full length of the barrel section between the muzzle-facing, buffer abutment surface 54 of the piston 51 and the buffer abutment surface 55 of the head member 31. As shown, for example by FIGURES 23 and 25, the buffer system 52 itself may not actually extend the full length of the barrel, but rather may extend between the buffer abutment surface 54 and the breech-facing end of either an energy absorbing component 202 of another type as shown in FIGURE 23, or a rigid spacer element 300 as shown in FIGURE 25, surrounding the piston rod portion 53 between the primary buffer elements and the head member abutment surface 55.

As previously indicated, the head member 31 may be a clamping jig 252 as shown in FIGURES 25 and 26. In any case, piston rod portion 53 has a flaring instrumentality, generally indicated by reference numeral 56, as its free end corresponding to work-piece contacting end 58 of flaring instrument 48.

In normal position prior to firing the tool, the end of the flaring instrumentality 56 is located a short distance away from the workpiece 305, as shown by FIGURES 1, 23 and 25, for example. This short distance, called the "stand-off" distance, permits the instrument to attain considerable velocity before striking the workpiece 305, thereby assuring its effectiveness by utilizing the generated kinetic energy to do part of the work. Provision for "standoff" also serves to reduce recoil in the tool as the instrument strikes the workpiece. Such recoil would tend to be very severe if high velocity of the instrument has not been attained by the time of the impact.

The arrangement of the parts and the operation of the tool have been described generally, its construction will now be described in greater detail.

At the muzzle end 30a of the tool, the head member 31 may be internally threaded, as at 64, for attachment to barrel section 30 on external threads 65 thereof. Threads 64 may also be utilized to engage the lock nut 45, as shown in FIGURE 1.

Attachment of receiver section 33 to barrel section 30 is effected by the barrel closure member 32 which has external threads 66 and 67 for engaging internal threads 68 and 69 of the barrel section and receiver section, respectively. At the junction, the closure member 32 has an annular straight surface 70 of diameter greater than that of threads 67, but less than that of threads 66 for engagement thereover of the trigger bracket 47, usually in a press fit attachment, by its aperture surface 71. The trigger bracket 47 is a part of the trigger mechanism of the tool which also includes the trigger lever 43 (or the trigger member 206 and its associated parts as will be described), a sear link 72 mounted for longitudinal movement on receiver section 33, and a sear 73.

For a better understanding of the preferred trigger mechanism particular reference is made to FIGURES 6 through 9 of the drawings which should be taken in conjunction with FIGURES 1, 2 and 4. It is seen that trigger bracket 47 has extending portions 74 and 75 thereof which are apertured for insertion of a transversely extending trigger pivot pin 76. The trigger lever 43 has hollowed, or inverted U-shape configuration and is apertured through its side portions, near its receiver-facing end, for pivotal connection on the pivot pin 76, as indicated, so that it extends along the barrel section 30 on one side of the tool. Trigger lever 43 also has a receiver-surrounding sleeve portion 77 formed by the half-cylinder shaped, depending extension portions 77a thereof which are joined together, as by welding, to form a lug 78 for engaging the sear link 72 disposed on the opposite side of the tool, the lug 78 fitting loosely in aperture 79 of the sear link. The sear link 72 is supported along receiver section 33 by extension of the bolt member guide pin 80 outward through the receiver section to engage the slot 81 of the sear link, as shown by FIGURE 1. A washer 82 and pin 83 of the guide pin 80 hold the sear link in place at its mid-portion, and a transversely extending pin 84 mounted in the body of the receiver section 33, engages end slots 85 formed in upturned side portions 86 of the sear link at its receiver end to hold it in place at this end location.

A hairpin spring 87 biases the trigger lever 43 away from the barrel section 30, the spring 87 being looped, as at 88, around pivot pin 76 so that its leg portion 89 rests against the surface of hand grip 44 and its other leg portion 90 is in pressure engagement with the underside surface of the trigger lever 43. Because of the biasing pressure, the end edge surface 91 of the trigger lever sleeve portion 77 will normally rest upon the receiver-facing end surface 92 of trigger bracket 47. As will be understood by reference to FIGURE 2, hand pressure on trigger lever 43 will urge it in clockwise direction, in the drawing, toward barrel section 30 and against the bias of spring 87, and its pivotal movement about pivot pin 76 will cause clockwise movement of receiver-surrounding sleeve portion 77, and consequent substantially longitudinal movement of the lug 78 a short distance toward the breech end 33a of the tool. The lug 78 carries the sear link 72 in longitudinal direction toward the breech end a similar distance which is sufficient to permit actuation of the sear 73 to trigger the firing mechanism in the bolt member 35 in a manner to be described.

For a better understanding of the firing action of the tool, reference should first be made to the construction of the bolt member 35 and its arrangement with respect to receiver section 33. In FIGURES 3 and 10 it is shown that the bolt member 35 has a head portion 93 and a body portion 94 connected for rotation with respect to the head portion, as by straight pins 95 which tangentially engage the peripheral groove 96 of the latter. A bolt plug 97 is loosely threaded within bolt body portion 94, as by NC-2 threads 98, in a manner to permit the body portion 94 to rotate about ninety degrees with respect to the plug 97 during the cocking of the tool to its firing condition, as will be later discussed. Bolt plug 97 has an aperture 99 therethrough for slidable passage of the firing pin 36, and has a rectangular slot 100 to slidably receive the extended key portion 101 of the firing pin head 37, the head 37 being firmly attached to the firing pin 36, as by attachment pin 102. Because of the key 101 and slot 100 arrangement, the firing pin head 37, and consequently the firing pin 36, is not rotatable with respect to the bolt plug 97.

Firing pin 36 has a central body portion 103 slidable within the bore 104 of bolt head portion 93 and a pointed striker portion 105 which is axially offset from the firing pin axis so as to strike the rim of the cartridge 50 when the tool is fired. A recess 106 is provided in the forward end 41 of the bolt member to receive the rimmed portion of the cartridge when the bolt is moved against barrel closure member 32, as previously described, and the striker portion 105 will move through aperture 107 to sharply strike and fire the cartridge 50. Such sharp, firing movement will be caused by a sudden release of compression in the main firing spring 108, as will be seen.

The main firing spring is assembled between the shoulder 109 of the firing pin central body portion 103 and the shoulder 110 formed by the end of bolt plug 97, the bias of the spring acting against these shoulders. To assemble the bolt member 35, bolt head portion 93 and bolt body portion 94 are first connected by appropriate press fit insertion of straight pins 95. The firing pin 36, absent firing pin head 37, is then inserted into the bore of the member, the striker portion 105 aligned within aperture 107. Spring 108 is then inserted over the pin 36 and against shoulder 109 thereof. Next, the bolt plug 97 is fitted over the firing pin 36 and threaded into the bolt body portion 94. The number of turns given the plug 97 on threads 98 will be sufficient to provide an appropriate "stand-off" distance of the end of the striker portion 105 from the forward end 41 of the bolt member when the assembly has been completed. Finally, the firing pin head 37 is attached to the firing pin 36, as by attachment pin 102, the key portion 101 thereof fitting into the solt 100 of the bolt plug 97.

As shown in FIGURES 3 and 10, the bolt body portion 94 has a notched cam surface 111 formed at a location on its end periphery, and a notched detent 113 also therein, which is in ninety-degree offset relation with respect to the bottom of cam surface 111. When the tool has been fired, the end edge 112 of the firing pin head key portion 101 will lie against the bottom of the notched cam surface 111, and it becomes apparent that the firing pin 36 may be "cocked," or primed against the bias of main firing spring 108 by rotating the bolt body portion 94 ninety degrees, in counterclockwise direction with respect to the bolt head portion 93, the bolt plug 97 and, consequently, the firing pin head 37 which is keyed into plug 97 as previously described. The rotative movement between these parts forces end edge 112 to follow up the slope of the cam surface 111 and off the end thereof to rest in the notched detent 113. The enforced longitudinal movement of the firing pin head 37 withdraws firing pin 36 a short distance, causing shoulder 109 thereof to sufficiently compress spring 108 against the stationary shoulder 110 of bolt plug 97 to cock the firing mechanism.

When the bolt member 35 has been mounted in receiver section 33, this cocking action will be effected by grasping and rotating the cylindrical bolt sleeve 38 in counterclockwise direction, the bolt sleeve 38 being attached, as by screw 114, to the protruding bolt handle portion 39 which is formed on bolt body portion 94, as by brazing or welding. Thus, twisting of the sleeve 38 will twist bolt body portion 94 with respect to both the head portion 93 and the firing pin head 37 to achieve the cocking, these members being held against rotative movement by other coacting elements. The bolt head portion 93 has a longitudinally extending slot 116 on its undersurface which slidably engages bolt member guide pin 80 to prevent its rotative movement, and the firing pin head key portion 101 slidably engages the longitudinally extending slot 117 of the receiver section 33 to prevent its rotative movement when the tool is being cocked. On the other hand, the bolt body portion 94 has two outwardly extending guide lugs 118a and 118b, one on each side at its head portion associated end, which slide in corresponding interior side slots 119a and 119b of the receiver section 33 as the bolt member is pushed forward for engagement of its forward end 41 with surface 42 of barrel closure member 32. The lugs 118 are free to rotate, in response to the aforesaid twisting motion, in the interior, semi-circumferentially extending slot 120 at the bottom of receiver section 33.

With these elements and arrangements in mind, a complete understanding of the loading, cocking and firing of the tool may now be had from the description of its operation, several additional elements to be referred to as the description proceeds. The description will first proceed on the assumption that the preferred trigger mechanism is incorporated in the tool as shown in FIGURES 1, 2 and 4, for example.

Prior to the mounting the bolt member 35 within the hollowed receiver section 33, the bolt member is placed in its "cocked" condition, the end edge 112 of firing pin head key portion 101 resting in the notched detent 113. In this condition, guide lugs 118 of the bolt body portion will be oriented ninety degrees away from a longitudinal plane through key portion 101 so that, as the bolt member is assembled onto the receiver section, these lugs 118 slide into side slots 119 as the key portion 101 slides into slot 117.

The receiver section 33 has a longitudinally extending slot 121 which is offset from the bottom centerline of the receiver section, as shown in FIGURE 10, for reception of a bolt stop 122 mounted therein on pin 84 and biased upwardly by a spring (not shown) into one of the interior side slots 119a of the receiver section. When the bolt member 35 is assembled onto the receiver section 33, one of the guide lugs 118a thereof will ride over the protruding portion 125 of the bolt stop 122, momentarily forcing the bolt stop to pivot downwardly on pin 84 whereupon, when the lug 118a has passed thereover, bolt stop 122 will spring upwardly into its normal position whereat its portion 125 will prevent bolt member 35 from wholly disengaging receiver section 33 during tool operation. In operation, when the bolt member is in its withdrawn position to expose the cartridge chamber 40, its lug 118a is against protruding portion 125 of the bolt stop. Of course, to remove bolt member 35 from the receiver section, one would lift the free end of the bolt stop 122 against its spring bias sufficiently to withdraw its protrusion 125 from slot 119a to permit the lug 118a to again pass thereover, as will be observed from a study of the drawings.

Leaving the bolt member 35 in its withdrawn position as shown by FIGURE 1, the breech 34 of the tool is open so that a blank cartridge 50 may be placed in the cartridge chamber 40. Bolt member 35 is then pushed forward towards barrel closure member 32, closing the breech 34, the guide lugs 118 sliding within receiver section side slots 119. The protruding, cam-shaped front end of the cartridge extractor 126, which is pivotally mounted in the side of bolt head portion 93 and spring biased toward its central axis, will come into contact with the outer edge of correspondingly cam-shaped extractor groove 127 formed in the surface 42 of closure member 32, and the forward end 41 of bolt member 35, therefore, will not be against the closure member surface 42. But, at this point, the rearward edge of guide lug 118b will have reached the start of the downward and longitudinally directed interior cam surface 128 on the rearward edge of semicircumferentially extending interior slot 120 of the receiver section. This cam surface 128 is arranged to lead the lug 118b into the slot upon clockwise twisting movement being exerted on bolt 38. As the lug 118b travels the short distance over the cam surface 128 during a few degrees of clockwise rotation the bolt member 35 will be forced forward the short remaining distance necessary to bring its forward end 41 into abutting engagement with surface 42 of the barrel closure member, the rim of the cartridge fitting into the recess 106 of the former. The extractor 126, of course, will snap over the peripheral rim of the cartridge 50 into the extractor groove 127 due to its spring bias. Simultaneously, these few degrees of clockwise rotation of bolt body portion 94 will cause the end edge 112 of firing pin head key portion 101 to ride out of the notched detent 113 onto the short, flat end surface of the bolt body portion 94 which lies between the detent 113 and the start of the surface track of notched end cam 111.

In this condition, the bolt member 35 has been moved into association with the cartridge chamber 40 but the tool will not fire because end edge 112 of key portion 101 of the firing pin head is against this short end surface of bolt body portion 94 and therefore cannot travel forward in response to any trigger action of the tool to permit the firing pin 36 to strike the cartridge 50. Thus, a safety position of the tool has been established wherein, upon a few degrees of clockwise rotation with respect to the receiver section 33, the bolt member 35 is locked in association with the cartridge chamber yet it is impossible to fire the tool. This safety position is clearly sensed by the operator as the rearward surface of lug 118b rides off the forward end of cam surface 128 into slidable engagement against the rearward wall of the interior slot 120.

To place the tool in condition for firing, the bolt sleeve 38 is further twisted in clockwise direction a full ninety degrees, which is determined by the edge 129 (FIGURES 5 and 10) of the bolt handle 39 coming into abutting contact with the edge 130 (FIGURE 1) of the slot 131 in the receiver section 33, the bolt handle portion 39 riding in the peripheral slot 131. This further rotation of the bolt body portion 94 with respect to the other elements of the bolt member 35 brings its notch 111 in line with the firing pin head key portion 101 and such positioning of these parts would permit the firing pin head 37, and hence the firing pin 36 to travel a longitudinal distance equal to the depth of the notch 111 so as to fire the tool were it not for the engagement of key portion 101, by its depending angular surface 132, with the corresponding angular surface 133 of the sear 73 as shown in FIGURE 8. These surfaces are held in abutting engagement, which prevents the firing pin 36 from moving forward until the tool is triggered, by the upward biasing force exerted on the sear 73 by its mounting spring 134 and by the positioning of the surface portion 135 of sear link 72 under the lower surface 136 of the sear 73 when trigger lever 43 is biased by hairpin spring 87 to its normal, pre-firing position. It is to be noted that the biasing pressure of the sear spring 134, alone, is not sufficient to prevent the movement of firing pin head 37, and it therefore becomes apparent that firing of the tool is achieved by longitudinal movement of the sear link 72, in direction toward the breech end 33a of the tool, a distance sufficient to bring its slot 137 under the lower surface 136 of the sear. Thus, when sear surface 136 rides off the sear link surface 135 into the sear link slot 137, the biasing force of main firing spring 108 pushes the firing pin 36 forward, sharply, to strike and explode cartridge 50, since the angular surface 132 of the key portion 101 will force the sear 73 downwardly into the slot 137 against the sear spring bias.

After the tool has been fired, the bolt sleeve 38 is grasped and rotated ninety degrees in counterclockwise direction, determined by abutting engagement of the edge 138 (FIGURES 5 and 10) of bolt handle portion 39 with edge 139 (FIGURES 1 and 10) of the slot 131 of the receiver section 33, to immediately again effect "cocking" of the firing pin 36 by forcing end edge 112 of firing pin head key portion 101 to ride up the notched cam surface 111 to fall into the notched detent 113 at the end of the rotated bolt body portion 94. The bolt member 35 is then slidably withdrawn against the bolt stop 122, guide lugs 118 riding within side slots 119.

Simultaneously with the withdrawal movement, the extractor 126 extracts the now spent cartridge 50 from the chamber 40, pulling it outward into juxtaposition with the ejector 140 so as to be ejected from the breech 34 of the tool. Ejector 140 is longitudinally mounted in a slot 141 of the receiver section 33 by a pin 142. It is biased by ejector spring 143 into its normal position within the slot 141 and, when the bolt member 35 is withdrawn, its protruding portion 144 will be struck by the end (not shown) of the slot 145 of bolt head portion 93 in which it rides so that the ejector will be thereupon pivoted outwardly into the breech 34 into contact with the withdrawn cartridge 50 to eject its from the tool, as is conventional in ejector operation. The tool is now ready to be reloaded for another flaring operation.

The modified trigger mechanism shown by FIGURE 23 causes tool actuation in essentially the same manner, except that the mechanism includes the trigger link 206 and trigger 212 for finger actuation rather than the trigger lever 43 which affords hand pressure actuation. In this embodiment, the extending portions 74 and 75 and the trigger pivot pin are omitted from the trigger bracket 47. Of course, trigger lever 43, including its receiver surrounding portion 77, and the hairpin type spring 87 are also omitted. Instead, the trigger bracket 47 has a trigger guard portion 207 attached thereto which extends along the barrel section 30 of the tool towards the muzzle end 30a. The hollowed undersurface 207a of the trigger guard is spaced away from the barrel 30 to provide a passage for longitudinal movement of the trigger link 206, the side edge surfaces 207b of the trigger guard surrounding the trigger link to contact the barrel surface for rigidity. The hand grip 44 may be slotted, as at 208, to pass around the guard portion 207 and trigger link 206, as indicated, during assembly. For greater rigidity of attachment, trigger guard portion 207 may be additionally attached to the barrel 30 by a band 209 near its muzzle-facing end, as shown.

At its muzzle-facing end, the trigger link 206 has a spring abutment portion 210, formed by simple, downward bending of its end portion, and a trigger cushioning spring guide member 211 attached to extend outwardly toward the muzzle end 30a of the tool. A trigger 212, of hollowed configuration, as shown in FIGURE 23a, is slidably mounted between the trigger guard 207 and the barrel section 30 (or the hand grip 44 thereof) at the muzzle-facing end of trigger link 206, slidable connection being effected by an attached slide pin 213 which rides within a longitudinally extending slot 214 of the trigger guard. A second trigger cushioning spring guide member 215 is attached within the hollow of the trigger 212 to telescope over the first referred to guide member 211, and a trigger cushioning spring 216 biases apart the trigger 212 and the trigger link 206 by abutment against the appropriate surface of abutment portion 210 of the trigger link and spring abutment surface 217. The trigger 212 is surrounded at its forward end by sponge rubber, as at 218.

A trigger spring 219 is situated between the trigger link 206 and the trigger guard 207 to bias the trigger link towards the muzzle end 30a of the tool. This spring 219 abuts against the appropriate surface of abutment portion 210 of the trigger link, being attached thereto as by a small, straight portion 220 of the spring being seated in a small hole 221 of the portion 210, and against trigger spring abutment means 222 on an undersurface of the trigger guard 207.

At its opposite, or breech end, the trigger link 206 is connected to the end of sear link 72, as by side notches 224 in engagement with the downwardly extending lug portions 223 of the sear link. Thus, when the trigger link 206 is moved longitudinally in direction towards the breech end 33a of the tool against the bias of trigger spring 219, it carries with it the sear link 72 to cause triggering of the tool in the same manner as has been described in connection with the preferred trigger mechanism arrangement. Trigger spring 219 effects repositioning of trigger link 206, and therefore the sear link 72, immediately after firing the tool as did the hairpin spring 87 in the previously described embodiment.

Where finger-actuation is preferred, the modified trigger mechanism effectively prevents the transmission of tool counter-recoil forces to the finger and hand of the operator. To fire the tool, the operator grasps it around the barrel hand grip 44 so that his finger is on the sponge rubber surface 218 of the trigger 212. The location of the trigger along the barrel section 30 is such that the tool will feel in balance when it is fired. Upon firing the tool, the tool will initially tend to recoil, or jerk rearwardly towards the operator, in response to the explosion of cartridge 50. But the buffer system 52 and piston 51 within the barrel of the tool will "bottom" against the muzzle end abutment 55 almost immediately as recoil forces are initiated, as will hereinafter be more fully described, and consequent counter-recoil forces will be set up in the tool which tend to jerk it forwardly, away from the operator. A conventional, finger-actuated trigger would transmit these recoil forces to the finger and hand, causing soreness and fatigue. However, it will be found that, by the finger-actuated trigger mechanism just described, these forces are effectively dampened by the trigger link and trigger arrangement provided which brings into play the trigger cushion spring 216. In the arrangement, the counter recoil forces will tend to be imparted to the finger through the tendency of trigger guard 207 to move forwardly in response to counter-recoil, this member being firmly attached to the tool, and since the tool will tend to move with respect to the hand of the operator. Because the trigger 212 is against the finger of the operator, the tool is also tending to move forwardly with respect to this trigger 212. The tool may slide, or move slightly forward in the hand in response to this tendency, whereupon the movement will be against the bias of trigger cushioning spring 216, causing its compression and resulting absorption of counter-recoil forces. The telescoping spring guide members 211 and 215 assure proper action of spring 216, and the sponge rubber 218 absorbs any excess of forces not fully absorbed by the spring 216. As will later become apparent, the buffer system 52 reduces recoil and counter-recoil forces, per se, so that the simple trigger mechanism construction here described will be extremely effective when incorporated within the tool of the invention.

The construction and arrangement of the novel cylindrical bolt sleeve 38 should be noted in conjunction with the results thereby afforded in the operation of the tool. It is of a convenient diameter and length for easy grasping, and it closely surrounds the receiver section 33 when the breech 34 is closed. The sleeve 38 has a cutaway portion, as at 146, so as to be clear of sear link 72 as the sleeve is rotated, yet assure the closeness of its fit around the receiver section. Further, it is made from lightweight material, such as vulcanized rubber-impregnated fibre, plastic, or the like, so as to reduce the total inertia of the tool when it is fired. Its cylindrical configuration, and its close fitting relationship surrounding the receiver, further balance and eliminate other inertia forces which would come into play upon firing the tool were a conventional, lever-type bolt handle to be used. For example, if a lever handle were used, its proportionately greater mass would extend outward on only one side of the tool, creating an unbalanced tool weight at the end of a lever, in effect, which, in turn, upon firing the tool would tend to cause the tool to pivot due to the inertia of the mass and the recoil forces in the tool. Further, and as previously mentioned, immediately after initial recoil, the tool will be subject to counter-recoil which occurs when the piston "bottoms," or comes to a stop against the muzzle end abutment within the barrel of the tool, and such counter-recoil will immediately reverse the recoil forces which would have been acting upon the tool. It is seen that the tool would be subject to erratic movement due to these forces and counter-forces, whereupon the tool would be difficult to control in the hands of the operator. As a result, the tool might fall from the operator's hand. Provision of the cylindrical bolt sleeve 38, instead of a conventional lever type handle, eliminates this possibility.

Referring now to the flaring instrument driver elements within the barrel section 30 of the tool, the piston 51 has a receiver-end portion 147 of considerably smaller diameter than its main body portion. In the normal condition of the tool prior to firing, the portion 147 resides within bore 148 of barrel closure member 32. The depth of the bore 148 and the corresponding height of the piston portion 147 is such that the bore volume will contain the powder gases which are generated at the instant of explosion of cartridge 50 to assure complete burning thereof before they are permitted to expand into the considerably greater diameter 30b of the barrel section. Of course, the piston has been initially driven forward by the explosion the distance equal to the depth of bore 148 within this instant.

As has been stated, the barrel enclosed piston rod portion 53 of punching instrument 48 is slidable through a surrounding buffer system, generally indicated by numeral 52, which absorbs piston energy and brakes the piston 51 during its travel towards the muzzle end of the tool when cartridge 50 is exploded. As shown by FIGURE 2, buffer system 52 is an assembly of elastically deformable buffer rings 149 spaced by metal impact discs or rings 150 in slidable engagement around the punching instrument shaft, or piston rod portion 53. Buffer rings 149 are made of neoprene, polyurethane, or similar material and have diameter considerably smaller than the diameter of interior surface 30b of barrel section 30. Referring to FIGURE 21, each buffer ring 149 has a relatively thick, cylindrical shape and is centrally apertured, as at 151, for slidable passage of the piston rod portion 53 therethrough. The impact rings 150 are relatively thin and have a diameter corresponding to the diameter of interior surface 30b of the barrel section 30 for slidable movement therein, and are also apertured for passage of the piston rod portion 53 in the same manner as are buffer rings 149.

As an example of a preferred embodiment of the invention, about eleven steel impact rings 150 and twelve buffer rings 149 may be used to provide a buffer system which completely fills the barrel of the tool. The stack of rings would extend the available length of barrel section 30, being slidably interposed between its breech end abutment surface 54, on piston 51, and its muzzle end abutment surface 55, on head member 31. Moreover, the buffer system 52 is preferably in slightly compressed condition when the piston 51 is in its normal, fully retracted position prior to firing the tool, as shown in FIGURE 1. As will be understood, however, fewer or more of either the buffer rings or the impact rings, or both, may be used in the system depending on factors, such as the length of the barrel and the length of stroke of the tool, to obtain desired effects.

It is intended that when the tool is fired, the flaring instrument 48 will be driven forward by the piston 51 a short distance in the direction of the muzzle end 30a of the tool into contact with the workpiece. As shown by FIGURE 2, at the end of its stroke, the instrument has moved forward only an inch or so until the buffer system 52 is fully compressed, the impelling movement of the piston being in response to explosion of the cartridge 50.

The resilience of the elastically deformable buffer rings 149 causes buffer system 52 to recover its normal length and arrangement within the barrel section 30 substantially instantaneously, as soon as the energy of the powder charge has been expanded. Thus, the flaring instrument 48 is immediately returned to its fully retracted position within barrel section 30 as soon as it as completed its stroke.

The resiliency of the buffer rings 149 also causes them to expand radially outward towards interior surface 30b of the barrel 30 during compression of their lengths when the tool is fired. The amount of expansion is sufficient to cause frictional contact with the barrel interior surface 30b so as to impart a braking effect between the buffer and the barrel which is in addition to the braking effect caused by simple compression of the buffer rings 149. As will be seen, other arrangements and construction of the buffer system provide a selection of braking effects which may be obtained, the amount and nature of radial expansion of the buffer rings controlling the amount and characteristics of the total braking effect provided by the system of the piston 51.

Thus, immediate elastic recovery by the buffer system of its initial, normal arrangement within the barrel of the tool causes simultaneous withdrawal of the flaring instrument from the now flared end 251 of the tubular workpiece 305 (FIGURE 27). The "full length" buffer system causes prompt, full retraction of the instrument after each firing of the tool so that the tool is safely and easily handled during and between flaring operations.

Where it is found that a greater length of instrument stroke is needed, provision for such may be incorporated in the tool simply by modifying the cross-sectional shape of the buffer rings 149 in the manner shown by FIGURE 22. The mass of each buffer ring is reduced significantly by providing peripherally chamfered oppositely disposed edge surfaces 152. The chamfer is considerable in its extent so that, in a barrel length of about eight inches, an additional one inch of stroke will be obtained over a buffer system which includes the rings of FIGURE 21, yet the same amount of energy will be absorbed by the tool and the workpiece.

As has been described, the buffer system of the invention provides a piston braking effect during the course of its travel within the barrel. The braking effect is brought about by axial compression of the elastically deformable buffer rings and also by their coincident elastic expansion in radial direction against the interior wall of the barrel. It has been found that, for best results, the buffer system compression loading curve, which shows braking effect imparted to the piston and punching instrument, is preferably linear, or nearly linear, with respect to the distance traveled.

It will be seen from consideration of FIGURES 1 and 2 that the arrangement and construction of the buffer system 52 shown therein will provide a curve of buffer system loading which is straight during its initial stages of compression, this being due to the uniform nature of axial compression of all the buffer rings 149 in sequence starting at the breech end 54 of the assembly, but that braking will begin to be more rapidly effected as the buffer rings expand radially into contact and compressive engagement with the barrel interior surface 30b, as shown by FIGURE 2. As a consequence, the load curve will turn sharply and increasingly upwards as the piston travels farther along the barrel length and as each successive ring 149 makes contact.

A greater amount of braking will be effected at earlier stages of piston travel, thus causing a straightening of the buffer system loading curve, by the modified buffer systems shown by FIGURES 12 through 20, inclusive.

In the modification shown by FIGURES 12, 13 and 14, the buffer rings 149a towards the breech end 33a of the tool are considerably softer and therefore more compressible than are the buffer rings 149b towards the muzzle end 30a of the tool. For example, rings 149a may have a hardness of 50, as measured by a durometer test, whereas rings 149b may have a hardness of 75. All of the rings 149 have uniform diameter, as was the case in the embodiment shown by FIGURES 1 and 2. As will be seen from FIGURE 13, this varying hardness between groups of buffer rings causes the breech end rings 149a to expand radially into contact with barrel interior surface 30b sooner than do the muzzle end rings 149b. As will be understood by those having skill in the art, the effect of this arrangement is to heighten the central zone of the loading curve, causing the total curve to be more linear. When the piston has traveled its full distance to a stop, as shown by FIGURE 14, all of the rings 149a and 149b have expanded radially into contact with the barrel interior surface 30b.

A similar effect can be achieved by grouping buffer rings having the same hardness but different diameters. Thus, referring to FIGURES 15, 16 and 17, rings 149a towards the breech end 33a of the tool have greater diameter, but the same durometer hardness, as the rings 149b towards the muzzle end 30a of the tool. As seen in FIGURE 16, movement of the piston towards the muzzle end of the tool causes rings 149a to contact the barrel interior surface 30b sooner than do the rings 149b. Hence, the braking effect due to radial expansion of the buffer rings occurs earlier with respect to piston travel, and the loading curve of the buffer system is made more linear.

Of course, it becomes apparent that arrangements may be provided to cause any desired braking effect by varying both the hardness and diameter of one or more of the buffer rings 149 of the buffer system 52.

Still another modification of the buffer system is shown by FIGURES 18, 19 and 20. In this arrangement, buffer rings 149a and 149b have the same diameters, and may or may not have the same hardness, but the buffer rings 149a are surrounded by a cylindrical brake lining 153. The lining 153 may be of rubber, or ordinary brake lining fabric, or any similar material having a measure of resiliency. In its normal position prior to firing the tool, the brake linings 153 has external diameter only slightly smaller than the internal diameter of the barrel. Thus, contact of the brake lining 153 with barrel interior surface 30b, due to radial expansion thereof in response to radial expansion of rings 149a, occurs almost instaneously upon firing the tool. Braking during substantially the full travel of the piston is thereby effected, and such braking increases at a more uniform rate as each ring 149a and then each ring 149b radially expands to sequentially cause increased frictional pressure on the barrel interior surface 30b. The compression loading curve of the system will be understood to become more linear.

Consideration of the possible variations of buffer ring configuration, hardness, diameter, and effective length lead to the conclusion that buffer rings equipped with surrounding sleeves, and buffer rings having size or hardness variation in the direction of their diameters, or lengths, or both, are within the contemplation of the invention, the design of the buffer system to promote exactly the desired amount and characteristics of piston braking becoming a matter of choice of these variables, once the principles of the invention are understood. The braking effect upon the piston, of course, will significantly reduce the counter-recoil shock which is experienced by the tool upon "bottoming" of the buffer system and piston against muzzle end abutment 55 as they come to a stop at the end of the stroke of the flaring instrument. The feature makes the tool more manageable by the operator since the tool will have little tendency to jerk forward, out of the operator's grasp, at the instant that such "bottoming" occurs. But the "bottoming" effect in the tool is sufficient to counteract initial tool recoil due to the explosion of the cartridge, the two effects occurring so close in time that the initial tendency of the tool to jerk backwards toward the operator, is counteracted almost at the instant the recoil effect would become noticeable to the operator. As previously stated, the cylindrical bolt sleeve and trigger arrangement prevents tendency in the tool to twist, or otherwise move erratically when fired.

It will be noted that buffer rings 149a toward the breech end 33a of the tool may show wear sooner than do the rings 149b since compression of the system occurs beginning at the breech end and the rings 149a will travel further in frictional sliding engagement with barrel interior surface 30b than rings 149b. Because of the simple, slidable mounting of the rings on the piston rod portion 53, replacement of the buffer rings of the system may be postponed and wear prolonged, by simple reversal of the order of arrangement of the rings on the rod from time to time.

A further modified form of buffer system is shown in FIGURE 23 by which different characteristics of energy absorption are obtained, and by which the distance of travel of the hole flaring instrument may be, in part, determined. For example, where a shorter stroke is desired, or where relatively soft buffer rings 149 are preferred, or where the amount of shock in the tool upon deceleration or "bottoming out" of the buffer system against the muzzle end abutment surface 55 is to be reduced, a fewer number of buffer rings 149 and metal impact discs 150 may be used in a given barrel length, and an additional, relatively incompressible, energy absorbing component 202 may be assembled in tandem with the rings 149 and discs 150 also surrounding the piston rod portion 53 to fill the remaining length of the barrel. As previously referred to, the buffer system 52 is preferably assembled normally to be in slightly compressed condition. The energy absorbing component 202 comprises a plurality of elastically deformable rings 202a spaced by metal rings 202b which, in FIGURE 23, are shown mounted on piston rod portion 53 towards the muzzle end 30a of the tool, extending between the end ring 225 and abutment surface 55. The elastically deformable rings 202a are formed of woven fabric, preferably woven nylon fibres, which are impregnated with an elastic polymer, preferably neoprene. Although relatively incompressible as compared with buffer rings 149, the rings 202a are sufficiently elastically deformable to absorb considerable impact energy which would otherwise be absorbed by the tool due to the high rate of deceleration of the piston 51 effected by buffer rings 149 and discs 150. This buffer system, including the shock absorbing component 202, will be employed, for example, in a tool intended for heavy duty use wherein a relatively greater powder charge 50 will be exploded. If the tool is accidentally fired without the flaring instrumentality 56 contacting the workpiece 305, the system will insure absorption of the excess shock which would ordinarily be absorbed by the workpiece.

It will be noted that the energy absorbing component 202 will not be axially compressed, or shortened any great extent when the tool is fired, and thus also serves as an effective rigid spacer element in the buffer system of the tool whereby a shorter length of stroke of the flaring instrument will be determined. Thus, the travel of the piston 51 and punching instrument 48 assembly may be adjusted and controlled by altering the relative lengths of the series of rings 149, 150 and the series of rings 202a, 202b. From the foregoing, it will be also apparent that inclusion of a rigid spacer element 300 in the buffer system 52, such as a steel cylinder of suitable length either with or without the component 202, is within the contemplation of the invention. An illustration of such embodiment is shown in FIGURE 25. Alternatively, a stack of steel impact rings 150 might be used as a spacer element. Of course, where the buffer system 52 is modified to include the component 202 or the rigid spacer element 300, it is still the highly elastically deformable nature of buffer rings 149 which accounts for full retraction of the flaring instrument immediately after firing the tool.

Turning now to the construction of head member 31, and referring particularly to FIGURES 25 through 32, the head member 31 is in the form of a tube clamping jig. The clamping jig head member 31 is conveniently and removably attached to the barrel section 30, such as by appropriate internal threads 64 engaging external threads 65 of the barrel section 30. The mass of the head member provides inertia to oppose tool firing forces. The lock nut 45 locks the engagement and also holds the hand grip 44 in place. The flaring instrument generally indicated by numeral 48 is formed by the piston rod portion 53 and a cone-shaped flaring instrumentality 56 which is attached, as by threads 254, to the end 58 thereof. The piston rod portion 53 extends for slidable linear movement through aperture 49 of the head member. As shown in FIGURE 1, the interior abutment surface 55 of head member 31 may provide the muzzle end abutment for the buffer system 52 or, alternatively and as shown in FIGURE 25, the aperture 49 may be formed in a muzzle end abutment piece 252a which is attached, as by press-fit connection 255, to the main frame portion of the clamping jig 252 as shown, to become effectively a part thereof. The abutment piece 252a has an internal peripheral slot 256 to entrap gases and thereby provide a gas cushion to assure free slidable movement of piston rod portion 53 through the aperture 49. In this alternative construction, the muzzle end abutment surface 55a, for buffer system 52, is on the abutment piece 252a.

The tapered work contacting surface 56a of the flaring instrumentality 56 will normally reside a short "stand-off" distance away from the end 251a of the tubular workpiece 305 which is to be flared so that the instrument will attain adequate velocity prior to striking the workpiece upon firing of the tool. The flaring instrumentality 56 will normally reside within a spaced recess 60 of the head member 31, which assists the operator in assuring that the predetermined proper amount of "stand-off" has been obtained.

The tubular workpiece 305 is clamped in position between the opposed jaws 257 and 258, at least the upper of which (jaw 257) is slidable along the vertical guide surface 259, 260 of the clamping aperture 261 formed in the head member 31, as shown. As illustrated in FIGURE 26 which shows the clamping jig in open position, the upper jaw 257 is guided in its vertical movement with respect to the lower jaw 258 by guide rods 262, 263 located at either side of the workpiece 305, the guide rods slidable within appropriate bores 264, 265 in the upper jaw 257 and the jaws being biased apart by spring means 266, 267. The guide rods 262 and 263 may extend through appropriate bores 268, 269 in the lower jaw 258, as shown. The springs 266 and 267 engage the shoulder portions 270, 271 formed by the widened bores 272, 273 in upper jaw 257, and also engage shoulder portions 274, 275 formed by the widened bores 276 and 277 in the lower jaw 258. A screw type clamping pressure member 278 threadedly engages an upper frame portion 279 of the head member 31, and engages the upper jaw 257 to exert clamping pressure thereon, as shown, so that when the member 278 is screwed downwardly, the upper jaw 257 will move downwardly against the bias of springs 266, 267 to clamp the workpiece in position for the flaring operation. The clamping jaws 257 and 258 have grip surfaces 280 and 281, respectively, such as formed by the finely serrated saw-tooth surface pattern indicated in FIGURE 25, to firmly grip the workpiece to prevent its movement with respect to the jaws during the punching operation.

The rigid frame which forms the clamping jig head member 31 also has a muzzle end aperture 282 formed therein for passage of the tubular workpiece 305 when it is to be clamped in the jig as illustrated in the drawings. The aperture 282 has a widened portion, as indicated at 282a (FIGURE 26) so that after the flare 251 has been formed on the workpiece 305, the workpiece may be conveniently removed from the head member 31 through the aperture 282 after the pressure member 278 has been backed off to release the clamping pressure on the workpiece by the clamping jaws 257, 258.

The clamping jaws 257 and 258 are made of hardened tool steel and are configured, as indicated at 283 and 284, respectively, to correspond with the taper of the surface 56a of the flaring instrumentality 56, so that the jaws serve as a backing die against which the flaring instrumentality will act when forming the flare 251 on the workpiece. The cone shaped flaring instrumentality 56 is also made of hardened tool steel.

Within the barrel section 30 the buffer system, generally indicated by numeral 52, has the elastically deformable buffer rings 149 and metal impact rings 150 arranged and constructed as previously described. In this embodiment of the invention, the buffer system includes a rigid spacer element 300, such as the illustrated metal cylinder, which extends between the buffer abutment surface 55a and the metal disc 225 at the muzzle end of the buffer stack. Together with the hardness, configuration, and number of buffer rings 149, as previously described, inclusion of the spacer element 300 will provide adjustment, depending on its length, of the length of stroke of the flaring instrument 48 in response to explosion of the cartridge 50 within the chamber 40, yet maintain full retraction of the flaring instrument upon completion of its stroke, as intended. Thus, when the tool is fired by applying hand pressure to trigger lever 43, the piston 51 is impelled forward by the expanding powder gases and causes the attached flaring instrument 48 to correspondingly move forward a predetermined short distance which is just sufficient to form the flare 251 on the workpiece by impact of the cone shaped instrumentality 56 thereon, yet not otherwise distort or unduly stress the workpiece material, whereupon the flaring instrument 48 will instantaneously retract to its normal, pre-fired position.

The flaring tool may be used to flare tubing of all practical diameter sizes and thicknesses, regardless of whether the tube material is hard or soft. Of course, the jaws 257 and 258 should correspond in diameter size with that of the tubing to be flared and in configuration to the flare to be formed. For this purpose both jaws are removable simply by disengaging the pressure member 278 from the upper jaw 257 and sliding both jaws together with their connecting guide rods and springs, as a unit, out of the frame aperture 261 to the side of the tool, as indicated by the drawings. New jaws are then positioned on the guide rods and springs and squeezed slightly together to be conveniently and slidably reinserted in the head member 31 through frame aperture 261. Where the proper size jaws are used, automatic centering of the tubular workpiece 305 is effected.

Positioning of the tubular workpiece 305 within the clamping jig head member 31 in axial direction, so as to produce an exact length of flare thereon upon firing of the tool, may be effected by sighting the end 251a of the workpiece, through the aperture 261, in line with the ends of the jaws 257, 258 which are generally in line with the vertical surface 260 of aperture 261. Alternatively, the end 251a of workpiece 305 may be moved against a stop provided by a workpiece positioning device such as that illustrated in two general embodiments in FIGURES 25, 28 and 29, and FIGURES 30–32, respectively, the latter being preferred.

Referring first to FIGURES 25 and 28, one form of work positioning device 285 may be incorporated in the tool by providing a pivotable shaft 286, which is aligned in axial direction with respect to the tool and workpiece, through a bore 287 formed in the head member 31. A workpiece stop 288 is attached at a right angle to the muzzle-facing end of the shaft 286 so as to radially depend therefrom into the recess 60 at the end of the jaw 257 to contact the end 251a of a tubular workpiece 305 which is to be clamped in the tool for flaring, as shown. A recess 289 is appropriately formed in the main frame of head member 31 at the top of the recess 60 to provide clearance for lateral swinging movement of the stop 288 when shaft 286 is pivoted in the manner to be described. In this connection, it should be noted that an edge portion 289a of recess 289 provides a stop to limit the amount of swinging movement of the stop 288 in direction towards its workpiece positioning station in front of the workpiece end 251a. Also in this regard, and particularly where small diameter tubes are to be flared using the tool, it may be necessary that the free end of the stop extend into close relationship with the cone-shaped instrumentality 56. For this purpose, the stop 288 may be appropriately beveled at its free end, as at 288a, to conform in shape with the instrumentality 56.

At the other end of the shaft 286 of this embodiment there is attached at a right angle thereto a finger lever 290 which normally will protrude radially outwardly from the tool as shown in FIGURES 28 and 29, for example. The finger lever 290 and the stop 288 are angularly disposed with respect to the shaft 286 and with respect to each other, in a manner as shown in FIGURES 28 and 29, so that, when the lever 290 is in its referred to outwardly protruding position, the stop 288 is properly positioned inwardly of the exterior surface of the tool. As shown by FIGURE 28, the normal position or station of the stop 288 corresponding to the normal protruding position or station of lever 290 may be such as would cause it to be out of the path of the workpiece 305, were the latter to be within the head member 31. Alternatively, as shown by FIGURE 29, the normal position of the stop 288 may be such that it lies within the path of the workpiece.

In either case, a bias spring 291 biases the stop 288 and the finger lever 290 to their normal positions. As shown, the spring 291 is wrapped around the shaft 286 near the lever end thereof, one end of the spring bent and fitted into a small drill hole 291a in the main frame of head member 31 and the other end of the spring bent and fitted into a similar drill hole 291b in the lever 290. The spring is in its relaxed condition when the lever and stop are in their referred to normal positions with respect to the tool.

Thus, when a tubular workpiece 305 is to be positioned within the clamping jig head member 31, the finger lever 290 of the workpiece positioning device 285 shown in FIGURES 25 and 28 is depressed by finger or thumb pressure against the bias of spring 291 to bring the stop 288 to its in-use position within the path of workpiece 305 at the time when it will be engaged by the tool. After the workpiece has been securely clamped within the head member, by operation of pressure member 278, the lever 290 is released whereupon the stop 288 will swing in response to the bias of spring 291 out of the path of the workpiece, and clear of the path of the flaring instrumentality 56, into its normal position. Alternatively, if the embodiment shown by FIGURE 29 is preferred, the tubular workpiece 305 may be accurately positioned in the head member 31 without any actuation of the workpiece positioning device 285 since the stop 288 is normally stationed in the path of the workpiece. It will be observed, however, that the stop 288 is also normally positioned within the path of the flaring instrumentality 56 and must be swung clear thereof before the tool is fired. Therefore, after the workpiece has been securely clamped in the tool and at the time of firing the tool, finger or thumb pressure must be exerted on the lever 290 to move it against the bias of spring 291 so as to swing the stop 288 out of the path of the instrumentality 56. After the tool has been fired, the buffer system therein will cause the flaring instrumentality 56 to immediately retract so that the finger lever 290 may be released promptly after firing to permit the stop 288 to swing in response to the bias of spring 291 into the path of the tubular workpiece 305 so as to automatically be stationed for positioning the next workpiece to be flared in a subsequent tool operation.

A preferred embodiment of the workpiece positioning device 285 is shown by FIGURES 30–32. In this embodiment the workpiece stop 288 is normally stationed in the path of workpiece 305 and flaring instrumentality 56 in the same manner as was the workpiece stop in the embodiment shown by FIGURE 29. Thus, the tool operator cannot inadvertently clamp a workpiece 305 in the tool without the workpiece having been properly positioned with respect to the length of flare which will be formed thereon. However, in the preferred embodiment, any likelihood that the operator might, through inadvertence, fail to depress the lever 290 of FIGURE 29, which would move the stop 288 out of the path of the instrumentality 56 as is necessary when the tool is fired, is eliminated. This is achieved by providing a combination sleeve and cam arrangement interconnecting the workpiece positioning device 285 and the trigger lever 43 of the tool as will now be described.

In this embodiment, the shaft 286 extends through the bore 287 of the main frame of the head member 31, and the stop 288 depends from the muzzle end thereof, fitting in the appropriately formed recess 289. The spring 291 is similarly arranged on the shaft 286, and biases the stop into its referred to normal position. However, the finger lever 290 of the other embodiments is eliminated and replaced by a cam follower lever 292 which extends radially from the end of the shaft 286, and has a cam follower 293 projecting therefrom to slidably engage the slot 294 of the cam protrusion 295, at the muzzle-facing end of a barrel sleeve 296 which is sleeved around the barrel section 30 of the tool for concentrically slidable movement. At the opposite end of the sleeve 296 there is a radially protruding trigger blocking stop 297 which will normally be in engagement with the underside of the lever 43 to prevent actuation and movement thereof towards the barrel 30 which would fire the tool at any time when the workpiece stop 288 is within the path of flaring instrumentality 56. It will be observed from the drawings that the bias of spring 291 also causes the sleeve 296 to be biased against rotatable movement such as would permit the trigger blocking stop 297 to disengage the underside of the trigger lever 43. In other words, the spring 291 biases both the workpiece stop 288 into the path of the tubular workpiece 305 and instrumentality 56 and the trigger blocking stop 297 into engagement with the underside of the trigger lever 43, these being the normal stations of the parts.

The sleeve 296 is made of material similar to that of the hand grip 44 which normally surrounds the barrel section 30. In operating a tool which incorporates the preferred embodiment of the workpiece positioning device 285, the tool may be safely loaded prior to its engagement with a workpiece upon which a flare is to be formed since the trigger lever 43 will be blocked against its tool actuating movement. The operator moves the tubular workpiece 305 into the head member 31 of the tool between the opposed jaws 257, 258 (or alternatively moves the tool over the workpiece), whereupon the end 251a of the workpiece 305 will be moved against the stop 288 so as to be positioned to form an accurate length of flare 251. The workpiece is clamped in this position by operating the pressure member 278. The operator then grasps the barrel sleeve 296, with his fingers at the underside thereof, and rotates the sleeve a few degrees in counter-clockwise direction, as shown by FIGURE 32, to move the trigger blocking stop 297 to the station shown in this latter figure of the drawings, whereupon the palm of the operator's hand will be found to be located over the trigger lever 43 in proper position to exert squeezing pressure thereon to fire the tool. After the tool has been fired, the buffer system therein causes immediate retraction of the flaring instrumentality 56 so that the operator may promptly release his grasp to permit the bias of spring 87 of the trigger lever 43 to swing the trigger lever away from the barrel 30 into its normal, pre-fired position and, substantially simultaneously, to permit the bias of spring 291 to rotate the sleeve 296 a few degrees in clockwise direction (FIGURE 32) to bring the trigger blocking stop 297 into its normal engagement with the underside of the trigger lever 43. Thus, the preferred workpiece positioning device 285, which incorporates the trigger blocking stop 297, provides a safety feature in the tool to protect the tool from damaging itself, as would happen were the tool to be fired with the workpiece stop 288 in its normal position in the path of the instrumentality 56. As previously pointed out, normal positioning of the stop 288 in the path of the instrumentality 56 and the workpiece 305 is desirable so as to insure against inadvertence in correctly positioning the workpiece in the tool.

Thus an explosively actuated tube flaring tool has been described which achieves all of the objects of the invention.

We claim:

1. An explosively actuated flaring tool comprising: a barrel having a breech end and a muzzle end, barrel closure means including a cartridge receiving chamber at said breech end of the barrel, an apertured abutment member at said muzzle end of the barrel, a piston slidable within said barrel and including an abutment surface facing towards said muzzle end of the barrel, an elongated rigid member attached to said piston to project from said piston abutment surface towards and in alignment with the aperture of said apertured abutment member for passage therethrough, said elongated rigid member terminating in a flaring tool instrumentality, buffer means comprising a stacked assembly of elastically deformable buffer rings of thick rubber-like material interleaved with rigid impact rings, said buffer means slidably interposed on said elongated rigid member and extending substantially the length of said barrel and engaging said piston abutment surface and said apertured abutment member, and means for firing a cartridge within said cartridge receiving chamber, whereby said buffer means substantially determines the length of stroke of said piston and elongated rigid member in response to the firing of such cartridge, and substantially instantaneously restores said piston and elongated rigid member to their initial positions upon completion of said stroke.

2. A flaring tool according to claim 1, wherein the diameter of said buffer rings is substantially less than that of said barrel and wherein the diameter of said impact rings is but slightly less than that of said barrel and such as to cause said impact rings to slide along said barrel.

3. A flaring tool according to claim 2, wherein at least one of said buffer rings has a diameter larger than other of said buffer rings.

4. A flaring tool according to claim 2, wherein at least one of said elastically deformable buffer rings has elastic hardness characteristics differing from that of other of said buffer rings.

5. A flaring tool according to claim 2, wherein brake lining material is sleeved around a plurality of said buffer rings, for radial expansion therewith into contact with said barrel.

6. A flaring tool according to claim 1, wherein at least one of said elastically deformable buffer rings has peripherally chamfered oppositely disposed edge surfaces.

7. An explosively actuated flaring tool according to claim 1, wherein said buffer means further comprises an additional stacked assembly of metal laminae interleaved with laminae of interlocked fibrous material impregnated with a resilient rubber-like polymer.

8. An explosively actuated flaring tool according to claim 1, wherein said apertured abutment member comprises a removable metal cylinder mounted within said barrel at its said muzzle end.

9. An explosively actuated flaring tool according to claim 1 wherein said stacked assembly of elastically deformable buffer rings is normally disposed in slightly compressed condition between said piston abutment surface and said apertured abutment member at said muzzle end of the barrel.

10. In an explosively actuated flaring tool having a longitudinally extending barrel section including a cartridge chamber and an attached receiver section mounting cartridge firing means, the improvement comprising a trigger mechanism for said firing means including a sear link mounted for longitudinal slidable movement on said receiver section, an elongated hand pressure operated trigger lever extending along one side of said tool resiliently mounted for movement under pressure toward said tool, and linkage connections between said trigger lever and said sear link, whereby pressure actuation of said trigger lever actuates said firing means of the tool.

11. In an explosively actuated flaring tool having a barrel section including a cartridge chamber and an attached receiver section mounting cartridge firing means, the improvement comprising a trigger mechanism for said firing means including a sear link mounted on said receiver section, and a hand pressure operated trigger lever extending along said barrel section and being pivotally and resiliently mounted for movement under pressure toward said barrel section, said sear link and trigger lever being mounted on diametrically opposed sides of said tool, and said trigger having integral therewith a sleeve portion surrounding said barrel and mechanically linked to said sear link for actuating the same in accordance with pressure actuation of said trigger lever.

12. In an explosively actuated flaring tool having a barrel section including a cartridge chamber and an attached receiver section mounting cartridge firing means, the improvement comprising a trigger mechanism for said firing means comprising a sear link mounted on said receiver section, a trigger link mounted on said barrel section and mechanically linked to said sear link for actuating the same, a trigger mounted on said barrel section for actuating said trigger link, cushion spring means operably interposed between said trigger link and said trigger biasing the same apart, and bias means for biasing said trigger link away from said sear link.

13. In an explosively actuated flaring tool, a trigger mechanism according to claim 12, including a trigger guard attached to said barrel section enclosing said trigger link and having slot means therein for guiding a guide pin extension of said trigger, and abutment means for said bias means of said trigger link.

14. An explosively actuated flaring tool comprising an enclosed barrel section having a cartridge chamber at one end and an aperture at the other end thereof, a receiver section attached to said one end of the barrel section, firing means of said tool including a withdrawable bolt member slidably mounted within said receiver section for operable association with said cartridge chamber, a cylindrical sleeve portion of said bolt member for grasping to withdraw said bolt member from said association with the cartridge chamber, a trigger mechanism of said tool including a sear link operably engaging said firing means and a hand pressure operated trigger lever extending along one side of said tool and operably engaging said sear link, a piston displaceable within said barrel, said piston including a breech end abutment surface, a piston rod extending from said piston in axial alignment with the aperture of said barrel for passage therethrough and terminating in a flaring tool instrumentality, and buffer means comprising a plurality of thick elastically deformable buffer rings spaced by substantially rigid impact rings slidably interposed on said rod and extending effectively the length of said barrel between said barrel aperture and said piston abutment surface.

15. An explosively actuated tool for flaring an end of a tubular workpiece comprising an enclosed barrel section having a cartridge chamber at one end and an aperture at the other end thereof, a receiver section attached to said one end of the barrel section, firing means including a withdrawable bolt member substantially surrounded by and slidably mounted within said receiver section for operable association with said cartridge chamber, a cylindrical sleeve portion of said bolt member for grasping to withdraw said bolt member from said association with the cartridge chamber and normally surrounding said receiver section when the bolt member is operably associated with said cartridge chamber, a trigger mechanism including a sear link operably engaging said firing means and a hand pressure operated trigger lever extending longitudinally along one side of said tool and operably engaging said sear link, a piston within said barrel section to be impelled towards said other end thereof in response to explosion of a cartridge within said cartridge chamber, a tube flaring instrument attached to said piston extending therefrom towards said other end of the barrel section and through said aperture thereat for linear movement responsive to said movement of the piston, a buffer system within said barrel section extending effectively the length thereof between said piston and said other end of the barrel section, said buffer system comprising elastic material deformable under compression force imparted thereto by said impelled movement of the piston whereby the buffer system determines the length of stroke of said tube flaring instrument and substantially instantaneously restores said tube flaring instrument and said piston to their initial positons wthin said barrel section upon completion of said stroke, and a tube clamping jig at said other end of the barrel secton for clamping said tubular workpiece in axially aligned position with respect to said flaring instrument.

16. An explosively actuated tube flaring tool according to claim 15, wherein said clamping jig includes opposed clamping jaw means slidably mounted therein, spring bias means biasing said jaw means in an open position to receive said workpiece, and a clamping pressure member engaging said jaw means for moving the same against the bias of said spring means to a closed position in clamping engagement with said workpiece.

17. An explosively actuated tube flaring tool according to claim 15, wherein said clamping jig includes releasable means for extending into contact relationship with said end of the tubular workpiece to position the same in said jig prior to said clamping and flaring thereof, and spring bias means of said releasable means, said spring bias means normally biasing said releasable means to a released position thereof out of the path of said flaring instrument.

18. An explosively actuated tube flaring tool according to claim 15, wherein said clamping jig includes releasable means for extending into contact relationship with said end of the tubular workpiece to position the same in said jig prior to said clamping and flaring thereof, and spring bias means of said releasable means, said spring bias means normally biasing said releasable means to a workpiece contacting position thereof, and said releasable means having an attached stop portion extending along said barrel section normally into engagement with said trigger lever for preventing its movement responsive to pressure thereon sufficient to fire said tool.

19. An explosively actuated tool for shaping the end of a workpiece comprising an enclosed barrel section having a cartridge chamber at one end and an aperture at the other end thereof, cartridge firing means operably associated with said cartridge chamber, a trigger mechanism for said firing means including a hand pressure operated trigger lever extending along one side of said tool, a piston within said barrel section to be impelled toward said other end thereof in response to explosion of a cartridge within said cartridge chamber, a workpiece shaping instrument attached to said piston extending therefrom towards said other end of the barrel section for linear movement through said aperture thereat responsive to said movement of the piston, a buffer system within said barrel section adapted to substantially instantaneously restore said workpiece shaping instrument to its initial position upon completion of a firing stroke thereof, a workpiece clamping jig at said other end of the barrel section, and a workpiece positioning device including a workpiece stop and associated bias means, said stop normally positioned and biased by said bias means into the path of said workpiece shaping instrument and movable against said bias out of said path, and means interconnecting said stop and said trigger lever so as to normally engage the latter to prevent its tool actuating movement when said stop is in its said normal position, the last said means movable with said stop means out of said trigger lever engagement.

20. A tool according to claim 19, wherein said means interconnecting said stop and said trigger lever includes a barrel sleeve mounted for rotatable movement on said barrel section, cam means interconnecting said barrel sleeve and workpiece stop, and a trigger lever blocking stop of said barrel sleeve.

21. An explosively actuated flaring tool comprising an enclosed barrel section having a cartridge chamber at one end and an aperture at the other end thereof, a receiver section attached to said one end of the barrel section, firing means including a withdrawable bolt member slidably mounted within said receiver section for operable association with said cartridge chamber, a cylindrical sleeve portion of said bolt member for grasping to withdraw said bolt member from said association with the cartridge chamber and normally surrounding said receiver section when the bolt member is operably associated with said cartridge chamber, a trigger mechanism of said tool including a sear link mounted for longitudinal movement on one side of said receiver section and a hand pressure operated trigger lever disposed along said barrel section on the side thereof opposite said side of the receiver section, said trigger lever pivotally connected to said barrel section at a location along the length of said trigger lever near an end thereof for movement toward said barrel section, said trigger lever having a receiver-surrounding portion extending from said end thereof and means connecting said portion and said sear link whereby said movement of the trigger lever actuates said firing means of the tool, a piston within said barrel section to to be impelled toward said other end thereof in response to explosion of a cartridge positioned within said cartridge chamber, a flaring instrument attached to said piston and extending therefrom towards said other end of the barrel section and through said aperture thereat for linear movement responsive to said movement of the piston, and a buffer system within said barrel section extending substantially the length thereof in operable association with said piston and flaring instrument, said buffer system comprising elastic material which is elastically deformable under compression force imparted thereto by said impelled movement of the piston to determine the length of stroke of said flaring instrument and to substantially instantaneously restore said flaring instrument to its initial position within said barrel section upon completion of said stroke.

22. In an explosively actuated flaring tool for flaring a metal workpiece, said tool having a barrel section, a substantially hollow cartridge receiving section attached at one end thereof to, and substantially aligned with, said barrel section and adapted to provide a breech for loading a cartridge therein, said receiving section having an open opposite end, and a bolt member mounted for longitudinal slidable movement within the hollow of said receiver section for opening and closing said breech, said bolt member extending through and substantially projecting from said open opposite end of the receiving section, the improvement comprising: a cylindrical bolt retractor of light weight material attached to and longitudinally movable with said bolt member, said retractor normally surrounding said receiving section when said bolt member is in its position closing said breech and having an interior surface in closely spaced relationship with respect to the external surface of said receiving section.

References Cited by the Examiner
UNITED STATES PATENTS

| | | | |
|---|---|---|---|
| 1,955,356 | 4/34 | Brenner | 153—81 |
| 2,132,947 | 10/38 | Gagne | 153—79 |
| 2,962,079 | 11/60 | Wilson | 153—79 |
| 2,993,522 | 7/61 | Temple et al. | 1—44.5 |
| 3,024,531 | 3/62 | Haskell et al. | 1—44.5 |

CHARLES W. LANHAM, *Primary Examiner.*
WILLIAM J. STEPHENSON, *Examiner.*